US008866810B2

(12) United States Patent  (10) Patent No.: US 8,866,810 B2
Cho et al.  (45) Date of Patent: Oct. 21, 2014

(54) MOBILE TERMINAL AND DISPLAY CONTROLLING METHOD THEREOF

(75) Inventors: Eun Woo Cho, Seoul (KR); Hyun Bin Shin, Seoul (KR); Joon Hun Shin, Seoul (KR); Young Soo An, Seoul (KR)

(73) Assignee: LG Electronics Inc., Seoul (KR)

( * ) Notice: Subject to any disclaimer, the term of this patent is extended or adjusted under 35 U.S.C. 154(b) by 791 days.

(21) Appl. No.: 12/769,604

(22) Filed: Apr. 28, 2010

(65) Prior Publication Data

US 2010/0315417 A1  Dec. 16, 2010

(30) Foreign Application Priority Data

Jul. 14, 2009 (KR) .................. 10-2009-0063955

(51) Int. Cl.
*G06T 15/00* (2011.01)
*G06F 1/16* (2006.01)
*G06F 3/0481* (2013.01)
*G06F 3/0488* (2013.01)

(52) U.S. Cl.
CPC ............ *G06F 3/0488* (2013.01); *G06F 1/1637* (2013.01); *G06F 3/04815* (2013.01); *G06F 1/1677* (2013.01); *G06F 1/1643* (2013.01); *G06F 1/1684* (2013.01); *G06F 1/1616* (2013.01); *G06F 3/0481* (2013.01); *G06F 2203/04802* (2013.01); *G06F 1/1647* (2013.01); *G06F 1/169* (2013.01)
USPC ........................................................ 345/419

(58) Field of Classification Search
None
See application file for complete search history.

(56) References Cited

U.S. PATENT DOCUMENTS

| 5,678,015 | A | 10/1997 | Goh | |
|---|---|---|---|---|
| 6,597,358 | B2 * | 7/2003 | Miller | 345/427 |
| 7,134,095 | B1 * | 11/2006 | Smith et al. | 715/860 |
| 7,216,305 | B1 * | 5/2007 | Jaeger | 715/849 |
| 7,277,572 | B2 * | 10/2007 | MacInnes et al. | 382/154 |
| 8,264,488 | B2 * | 9/2012 | Ueno | 345/427 |
| 2003/0156146 | A1 | 8/2003 | Suomela et al. | |
| 2008/0034314 | A1 * | 2/2008 | Louch et al. | 715/778 |
| 2008/0186305 | A1 * | 8/2008 | Carter | 345/419 |
| 2009/0089692 | A1 * | 4/2009 | Morris | 715/764 |
| 2010/0115471 | A1 * | 5/2010 | Louch et al. | 715/849 |
| 2010/0169836 | A1 * | 7/2010 | Stallings et al. | 715/848 |

FOREIGN PATENT DOCUMENTS

CN 101291492 10/2008
CN 101321204 12/2008

OTHER PUBLICATIONS

European Patent Office Application Serial No. 10166194.0, Search Report dated Apr. 5, 2013, 6 pages.

* cited by examiner

*Primary Examiner* — Phi Hoang
*Assistant Examiner* — Mohammad H Akhavannik
(74) *Attorney, Agent, or Firm* — Lee, Hong, Degerman, Kang & Waimey

(57) ABSTRACT

A mobile terminal and display controlling method thereof are provided. The present invention includes determining a polyhedral shape to correspond to a number of display target objects, designating the number of display target objects to facets of a polyhedron having the determined polyhedral shape, displaying the polyhedron having the determined polyhedral shape in a three-dimensional rotational position, and displaying the number of display target objects on the designated facets of the polyhedron.

16 Claims, 44 Drawing Sheets

MOBILE TERMINAL AND DISPLAY CONTROLLING METHOD THEREOF

CROSS-REFERENCE TO RELATED APPLICATIONS

Pursuant to 35 U.S.C. §119(a), this application claims the benefit of an earlier filing date and a right of priority to Korean Application No. 10-2009-0063955, filed on Jul. 14, 2009, the contents of which are hereby incorporated by reference herein in their entirety.

BACKGROUND

1. Technical Field

The present disclosure relates to a mobile terminal, and more particularly, a method of controlling a display of the mobile terminal, such as displaying a $3^{rd}$ dimensional polyhedron having each facet of the polyhedron indicate prescribed information.

2. Discussion of the Related Art

Generally, terminals can be classified as mobile or portable terminals and stationary terminals. The mobile terminals can be classified as handheld terminals or vehicle mount terminals according to portability.

As functions of the terminal are diversified, the mobile terminal is implemented as a multimedia player provided with composite functions such as capturing photographs or moving pictures, playing back music or moving picture files, playing games, and receiving broadcasts. To enhance the mobile terminal functions, it may be possible to improve structural and software aspects of the mobile terminal.

According to related art, a mobile terminal can display a polyhedron with prescribed information is represented on each facet of the displayed polyhedron. For example, the prescribed information can include a menu item. Additionally, a preset menu item can be displayed on each facet of the polyhedron.

Furthermore, the related art teaches that the displayed polyhedron is a preset polyhedral type, such as a hexahedron in a cubic shape. Accordingly, the number of facets of the polyhedron is fixed since the polyhedral is preset to display a fixed number of menu items according to its preset polyhedral type.

Moreover, the related art teaches that the mobile terminal can rotate a polyhedron already displayed on a screen by a predetermined angle only if a polyhedron rotating signal is input by a user. However, the mobile terminal according to the related art is unable to rotate the polyhedron if the polyhedron rotating signal is not input by the user.

Moreover, even if the polyhedron rotating signal is input, the polyhedron stops rotating as soon as a facet corresponding to the input polyhedron rotating signal is arranged at a front side of the polyhedron. Therefore, it is inconvenient for the user to input a polyhedron rotating signal each time a facet of the polyhedron needs to appear at the front side of the polyhedron.

SUMMARY

The present invention is directed to a mobile terminal and display controlling method that substantially obviate one or more problems due to limitations and disadvantages of the related art.

An object of the present invention is to provide a mobile terminal and display controlling method so that a polyhedron having a polyhedral shape corresponding to a number of display target objects can be displayed by the mobile terminal.

Another object of the present invention is to provide a mobile terminal and display controlling method thereof, by which a polyhedron having a display target object designated to each facet of the polyhedron, can be rotationally displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes a controller unit for determining a polyhedron having a polyhedral shape according to a number of display target objects, the controller unit designating each of the number of display target objects to a facet of the polyhedron, and a display module for displaying the polyhedron in three dimensions under control of the controller unit, the display module displaying each of the number of display target objects on the designated facet of the polyhedron.

In another aspect of the present invention, a mobile terminal includes a controller unit for designating a plurality of display target objects to a plurality of facets of a polyhedron, and a display module for displaying the polyhedron, the display module displaying the plurality of display target objects on the plurality of facets of the polyhedron designated by the controller unit, in which the controller unit controls the display module to display the polyhedron in a three-dimensional rotational position, and at least one of the plurality of facets is sequentially arranged at a front-view side of the polyhedron so the at least one of the plurality of facets is visible when the polyhedron is displayed in the three-dimensional rotational position.

In a further aspect of the present invention, a method of controlling a display in a mobile terminal includes the steps of determining a polyhedral shape to correspond to a number of display target objects, designating the number of display target objects to facets of a polyhedron having the determined polyhedral shape, displaying the polyhedron having the determined polyhedral shape in a three-dimensional rotational position, and displaying the number of display target objects on the designated facets of the polyhedron.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

Mobile terminals described in this disclosure can include a mobile phone, a smart phone, a laptop computer, a digital broadcast terminal, a PDA (personal digital assistants), a PMP (portable multimedia player), and a navigation system.

It may be apparent to those skilled in the art that the configurations according to an embodiment described in this disclosure may be applicable to a stationary terminal, such as a digital television (TV) and a desktop computer.

Figure 1A:
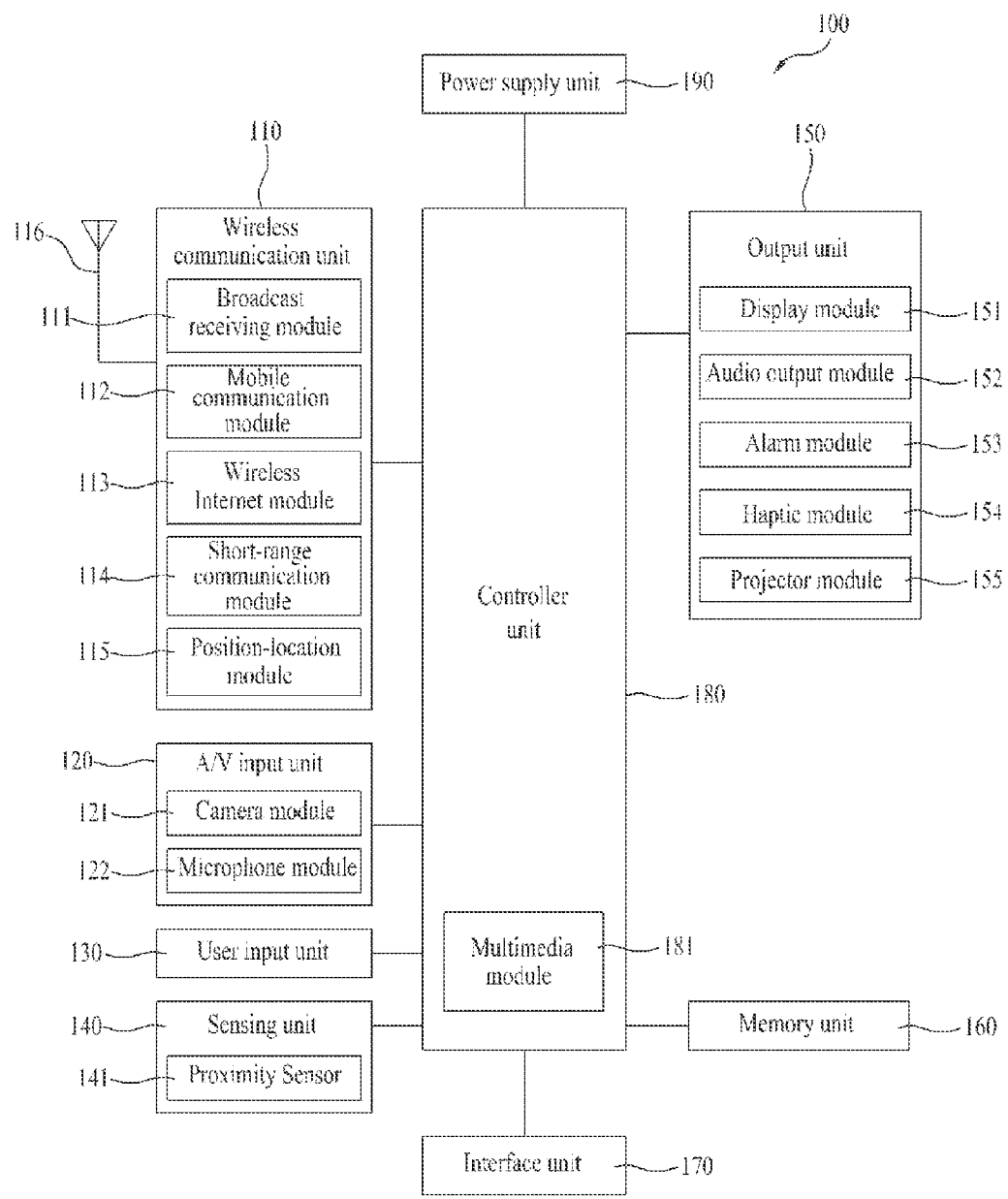
FIG. 1A is a block diagram of a mobile terminal according to an embodiment of the present invention.

FIG. 1A is a block diagram of a mobile terminal 100 according to an embodiment of the present invention. The mobile terminal 100 according to an embodiment of the present invention includes a wireless communication unit 110, an A/V (audio/video) input unit 120, a user input unit 130, a sensing unit 140, an output unit 150, a memory unit 160, an interface unit 170, a controller unit 180, and a power supply unit 190. FIG. 1A shows the mobile terminal 100 having various components, but it is understood that implementing all of the illustrated components is not required. Greater or fewer components may alternatively be implemented.

The wireless communication unit 110 can include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server (not shown) via a broadcast channel. The broadcast channel may include a satellite channel and a terrestrial channel.

The broadcast managing server generally refers to a server which generates and transmits the generated broadcast signal and/or broadcast associated information or a server which is provided with a previously generated broadcast signal and/or broadcast associated information and then transmits the provided broadcast signal or information to the mobile terminal 100. The transmitted broadcast signal may be implemented as a television (TV) broadcast signal, a radio broadcast signal, and a data broadcast signal. The transmitted broadcast signal may be combined with a TV or radio broadcast signal.

The broadcast associated information can include information associated with a broadcast channel, a broadcast program, and a broadcast service provider. The broadcast associated information can be provided via a mobile communication network, and be received by the mobile communication module 112 via an antenna 116.

The broadcast associated information can be implemented in various forms. For example, broadcast associated information may include an electronic program guide (EPG) related to digital multimedia broadcasting (DMB) and electronic service guide (ESG) related to digital video broadcast-handheld (DVB-H).

The broadcast receiving module 111 may be configured to receive broadcast signals transmitted from various types of broadcasting systems. The broadcasting systems can include digital multimedia broadcasting-terrestrial (DMB-T), digital multimedia broadcasting-satellite (DMB-S), digital video broadcast-handheld (DVB-H), media forward link only (MediaFLO®) and integrated services digital broadcast-terrestrial (ISDB-T). Greater or fewer broadcasting systems can be received by the broadcast receiving module 111.

The broadcast signal and/or broadcast associated information received by the broadcast receiving module 111 may be stored in a storage device, such as the memory unit 160.

The mobile communication module 112 transmits and receives wireless signals to and from one or more network entities (e.g., base station, external terminal, server) via the antenna 116. The transmitted and received wireless signals may represent audio, video, and data signals according to text or multimedia message transmissions.

The wireless Internet module 113 supports Internet access for the mobile terminal 100. The wireless Internet module 113 may be internally or externally coupled to the mobile terminal 100. In this case, the wireless Internet technology supported by the wireless Internet module 113 can include WLAN (Wireless LAN), Wireless Fidelity (Wi-Fi™), Wibro (Wireless broadband), WiMAX (World Interoperability for Microwave Access), and HSDPA (High Speed Downlink Packet Access).

The short-range communication module 114 facilitates relatively short-range communications. Suitable technologies for implementing the short-range communication module 114 can include radio frequency identification (RFID), infrared data association (IrDA), ultra-wideband (UWB), Bluetooth® and ZigBee®.

The position-location module 115 identifies or obtains location data of the mobile terminal 100. The position-location module 115 may be implemented with a global positioning system (GPS) module (not shown).

The audio/video (A/V) input unit 120 can be configured to provide audio or video signal input to the mobile terminal 100. The A/V input unit 120 can include a camera module 121 and a microphone module 122. The camera module 121 can receive and process image frames of still pictures (e.g., photographs) obtained by an image sensor when the mobile terminal 100 is in a photographing mode, and alternatively, receive and process moving picture data (e.g., video) when the mobile terminal 100 is in a video call mode. The processed image frames can be displayed by the output unit 150, such as the display module 151.

The image frames processed by the camera module 121 can be stored in the memory unit 160 or can be externally transmitted via the wireless communication unit 110. At least two camera modules 121 can be provided in the mobile terminal 100 depending on the usage environment.

The microphone module 122 receives an external audio signal while the mobile terminal 100 is in a particular mode, such as a phone call mode, a recording mode and a voice recognition mode. The external audio signal is processed and converted into digital audio data. The digital audio data is transformed into a format transmittable to a mobile communication base station via the mobile communication module 112 when the mobile terminal 100 is in a call mode. The microphone module 122 can include assorted noise removing algorithms to remove noise generated when receiving the external audio signal.

The user input unit 130 generates input data responsive to user manipulation of one or more associated input devices. Examples of such input devices can include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal 100. For example, the sensing unit 140 may detect an open/close status of the mobile terminal 100, a relative positioning of components (e.g., a display and keypad) of the mobile terminal 100, a change of position of the mobile terminal 100 or a component of the mobile terminal 100, a presence or absence of user contact with the mobile terminal 100, or an orientation or acceleration/deceleration of the mobile terminal 100.

In another example, when the mobile terminal 100 is configured as a slide-type mobile terminal, the sensing unit 140 may sense whether a sliding portion of the mobile terminal 100 is open or closed. In another example, the sensing unit 140 can sense the presence or absence of power provided by the power supply unit 190, the presence or absence of a coupling or connection between the interface unit 170 and a device external to the mobile terminal 100. The sensing unit 140 can include a proximity sensor 141.

The output unit 150 generates outputs relevant to senses of sight, hearing, and touch. The output unit 150 can include the display module 151, an audio output module 152, an alarm module 153, a haptic module 154, and a projector module 155.

The display module 151 can be implemented to visually display or output information associated with the mobile terminal 100. For example, if the mobile terminal 100 is operating in a phone call mode, the display module 151 can provide a user interface (UI) or graphical user interface (GUI) which includes information associated with placing, conducting, and terminating a phone call. In another example, if the mobile terminal 100 is in a video call mode or a photographing mode, the display module 151 may additionally or alternatively display images which are associated with the photographing or video call modes, the UI or the GUI.

The display module 151 may be implemented using one or more display technologies which include a liquid crystal display (LCD), a thin film transistor-liquid crystal display (TFT-LCD), an organic light-emitting diode display (OLED), a flexible display and a three-dimensional (3D) display. Moreover, a transparent display can be implemented using some of the foregoing display technologies in a transparent or optical transmittive type, such as a transparent OLED (TOLED).

A rear configuration of the display module 151 can be implemented in the optical transmittive type as well. In this configuration, a user can see an object at a rear portion of the mobile terminal 100 via an area occupied by the display module 151.

At least two display modules 151 can be provided in the mobile terminal 100. For example, a plurality of display modules 151 can be arranged on a single face of the mobile terminal 100 spaced apart from each other or built into one body. Alternatively, a plurality of display modules 151 can be arranged on different faces of the mobile terminal 100.

If the display module 151 and the sensing unit 140 for detecting a touch action (hereinafter called "touch sensor") are configured as a mutual layer structure (hereinafter called "touchscreen"), the display module 151 can be used as a user input unit 130 as well as an output unit 150. The touch sensor can be configured as a touch film, a touch sheet, or a touchpad.

The touch sensor can be configured to convert a pressure applied to a specific portion of the display module 151 or a variation of a capacitance generated from a specific portion of the display module 151 to an electric input signal. Accordingly, the touch sensor detects a pressure of a touch as well as a touched position or size.

If a touch input is made to the touch sensor, signal(s) corresponding to the touch input is transferred to a touch controller (not shown). The touch controller processes the signal(s) and then transfers the processed signal(s) to the controller unit 180. Therefore, the controller unit 180 can determine whether a prescribed portion of the display module 151 has been touched.

The proximity sensor 141 can be provided to an internal area of the mobile terminal 100 enclosed by the display module 151, such as the touchscreen or around the touchscreen. The proximity sensor 141 is a sensor that detects a presence of an object approaching a prescribed detecting surface or an object existing around the proximity sensor 141 using an electromagnetic field strength or infrared ray without mechanical contact. The proximity sensor 141 can be more durable and more useful than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. If the touchscreen includes the electrostatic capacity proximity sensor, the touchscreen is configured to detect the proximity of a pointer according to a variation in an electric field formed by the proximity of the pointer to the touchscreen. Accordingly, the touchscreen or touch sensor can be classified as the proximity sensor 141.

An action when a pointer approaches without contacting the touchscreen so the pointer is recognized as being located on the touchscreen is defined as "proximity touch." An action when a pointer actually touches the touchscreen is defined as "contact touch." The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, or a proximity touch shift state.). Information corresponding to the detected proximity touch action and the detected proximity touch pattern can be displayed on the touchscreen.

Figure 1B:
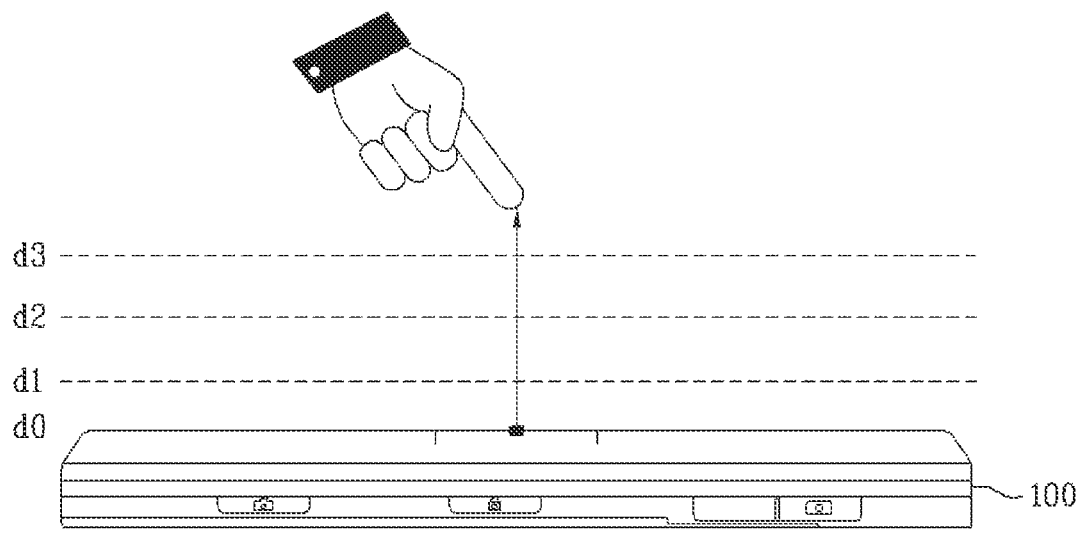
FIG. 1B is a diagram to explain the concept of proximity depth of a proximity sensor according to an embodiment of the present invention.

FIG. 1B is a conceptual diagram for explaining a proximity depth of a proximity sensor according to an embodiment of the present invention. When a pointer, such as a user's finger or a pen approaches the display module 151, the proximity sensor 141 provided within or in the vicinity of the display module 151 detects the approach of the pointer and then outputs a proximity signal. The proximity sensor 141 can be configured to output a different proximity signal according to a distance between the pointer and the proximity-touched display module 151 (hereinafter "proximity depth").

Referring to FIG. 1B, a cross-section of the mobile terminal 100 is provided with a proximity sensor 141 capable of sensing three proximity depths, for example. It can be understood that the proximity sensor 141 can be capable of sensing proximity depths amounting to a number smaller than 3 and equal to or greater than 4.

For example, when the pointer is fully contacted with the display module 151 at d0, the relation is recognized as a contact touch. When the pointer is spaced apart from the display module 151 at a distance d1, the relation is recognized as a proximity touch at a first proximity depth. When the pointer is spaced apart from the display module 151 at a distance between d1 and d2, the relation is recognized as a proximity touch at a second proximity depth. When the pointer is spaced apart from the display module 151 at a distance between d2 and d3, the relation is recognized as a proximity touch at a third proximity depth. Further, when the pointer is spaced apart from the display module 151 at a distance equal to or greater than d3, no proximity touch is recognized.

Hence, the controller unit 180 can recognize the proximity touch as one of various input signals according to the proximity depth and position of the pointer relative to the display module 151. In some examples, the controller unit 180 can perform various operation controls according to the various input signals.

The audio output module 152 functions in various modes including a call-receiving mode, a call-placing mode, a recording mode, a voice recognition mode, and a broadcast reception mode in order to output audio data which is received from the wireless communication unit 110 or stored in the memory unit 160. During operation, the audio output module 152 outputs audio relating to a particular function (e.g., call received, message received). The audio output module 152 can be implemented individually or by using one or more speakers, buzzers, and other audio producing devices.

The alarm module 153 outputs a signal for announcing an occurrence of a particular event associated with the mobile terminal 100. Examples of the announced events can include a call received event, a message received event and a touch input received event.

The alarm module 153 can output a signal for announcing the event occurrence by way of vibration as well as via a video or audio signal. The video or audio signal can be output via the display module 151 or the audio output module 152. Hence, the display module 151 or the audio output module 152 can be regarded as a part of the alarm module 153.

The haptic module 154 generates various tactile effects that can be sensed by a user. Vibration is a representative tactile effect generated by the haptic module 154. Strength and pattern of the vibration generated by the haptic module 154 can be controlled. For example, different vibrations can be output simultaneously or sequentially.

The haptic module 154 can generate various tactile effects as well as the vibration. For example, the haptic module 154 generates an effect attributed to the arrangement of pins vertically moving against a contact skin surface, an effect attributed to the injection/suction power of air though an injection/suction hole, an effect attributed to skimming over a skin surface, an effect attributed to the contact with an electrode, an effect attributed to electrostatic force, or an effect attributed to the representation of hold/cold sense using an endothermic or exothermic device.

The haptic module 154 can be implemented to enable a user to sense the tactile effect through a muscle sense of a finger or an arm as well as to transfer the tactile effect through direct contact. At least two haptic modules 154 can be provided in the mobile terminal 100.

The projector module 155 can perform an image projector function using the mobile terminal 100. The projector module 155 can display an image, which is identical to or partially different from an image displayed on the display module 151, an external screen or a wall according to a control signal of the controller unit 180.

The projector module 155 can include a light source (not shown) that generates light (e.g., laser) for projecting an image externally, an image producing means (not shown) for producing an image to output externally using the light generated from the light source, and a lens (not shown in the drawing) for enlarging the output of the externally projected image over a predetermined focus distance. The projector module 155 can further include a device (not shown) for adjusting the direction of the projected image by mechanically moving the lens or the projector module 155.

The projector module 155 can be implemented as a CRT (cathode ray tube) module, an LCD (liquid crystal display) module, or a DLP (digital light processing) module. For example, the DLP module can be operated by enabling the light generated from the light source to reflect on a DMD (digital micro-mirror device) chip and can be advantageous for reducing the size of the projector module 155.

Preferably, the projector module 155 is provided in a length direction of a lateral, front or backside direction of the mobile terminal 100. It can be understood that the projector module 155 can be provided to any portion of the mobile terminal 100.

The memory unit 160 can be used to store various types of data to support processing, control, and storage requirements of the mobile terminal 100. Examples of such stored data include program instructions for applications operating on the mobile terminal 100, contact data, phonebook data, messages, audio, still pictures, and moving pictures. The memory unit 160 can also store a recent use history or a cumulative use frequency of each data (e.g., use frequency for each phonebook, each message or each multimedia). Moreover, data for various patterns of vibration and/or sound output can be stored in the memory unit 160 when a touch input to the touchscreen is sensed.

The memory unit 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. Further, the mobile terminal 100 can operate via a web storage entity for performing a storage function of the memory unit 160 on the Internet.

The interface unit 170 can be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and an earphone port.

The identity module (not shown) can be an integrated circuit for storing various types of information for authenticating a use authority of the mobile terminal 100 and can include a User Identify Module (UIM), Subscriber Identify Module (SIM), and Universal Subscriber Identity Module (USIM). A device having the identity module (hereinafter called "identity device") can be manufactured as a smart card. Therefore, the identity device can be connected to the mobile terminal 100 via a corresponding port.

When the mobile terminal 100 is connected to an external cradle, the interface unit 170 provides a passage for supplying power to the mobile terminal 100 from the external cradle or a passage for delivering various command signals input by a user via the external cradle, to the mobile terminal 100. Each of the delivered command signals input via the external cradle or the supplied power can signal that the mobile terminal 100 has been correctly loaded in the external cradle.

The controller unit 180 controls the overall operations of the mobile terminal 100. For example, the controller unit 180 controls and processes voice calls, data communications, and video calls. The controller unit 180 may include a multimedia module 181 that provides multimedia playback. The multimedia module 181 may be configured as part of the controller unit 180, or implemented as a separate component. Moreover, the controller unit 180 can perform a pattern recognition process for recognizing characters of a written input and images of a picture drawing input carried out on the touchscreen.

The power supply unit 190 provides power required by the various components of the mobile terminal 100. The provided power may be provided internally or externally to the mobile terminal 100.

Various embodiments described herein may be implemented in a computer-readable medium using, for example, computer software, hardware, or some combination thereof. For a hardware implementation, the embodiments described herein may be implemented individually or combined within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. The foregoing embodiments may also be implemented by the controller unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory unit 160, and executed by a controller or processor, such as the controller unit 180.

Figure 2:
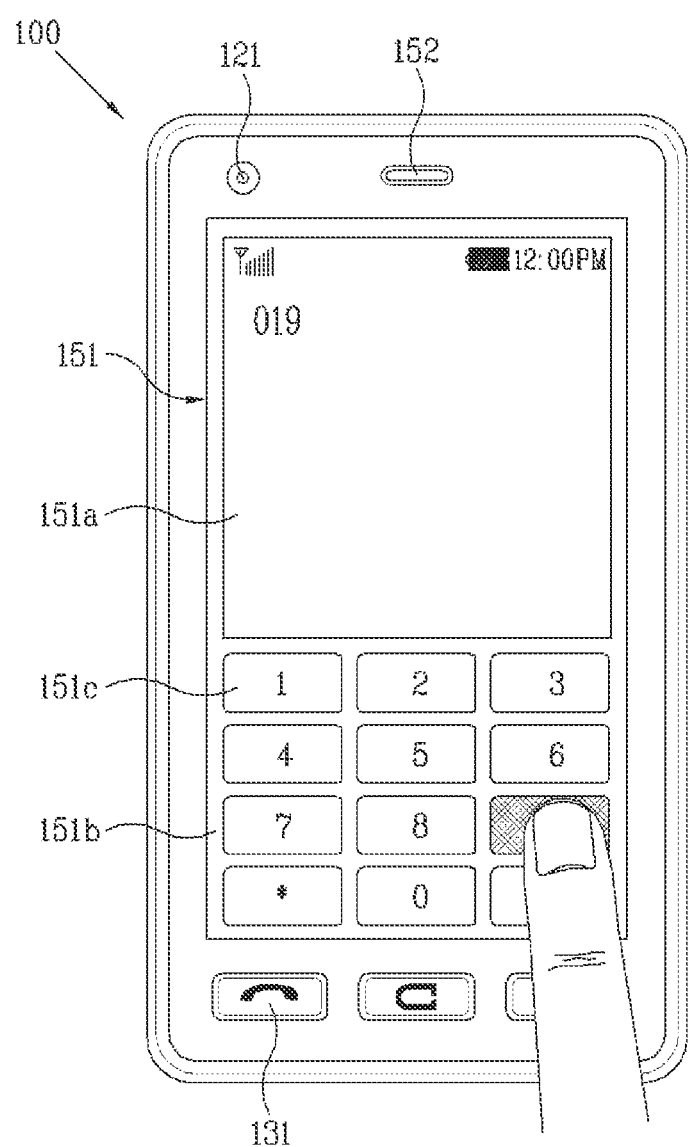
FIG. 2 and FIG. 3 are front diagrams of a mobile terminal according to an embodiment of the present invention for explaining an operational status of the mobile terminal.
Figure 3:
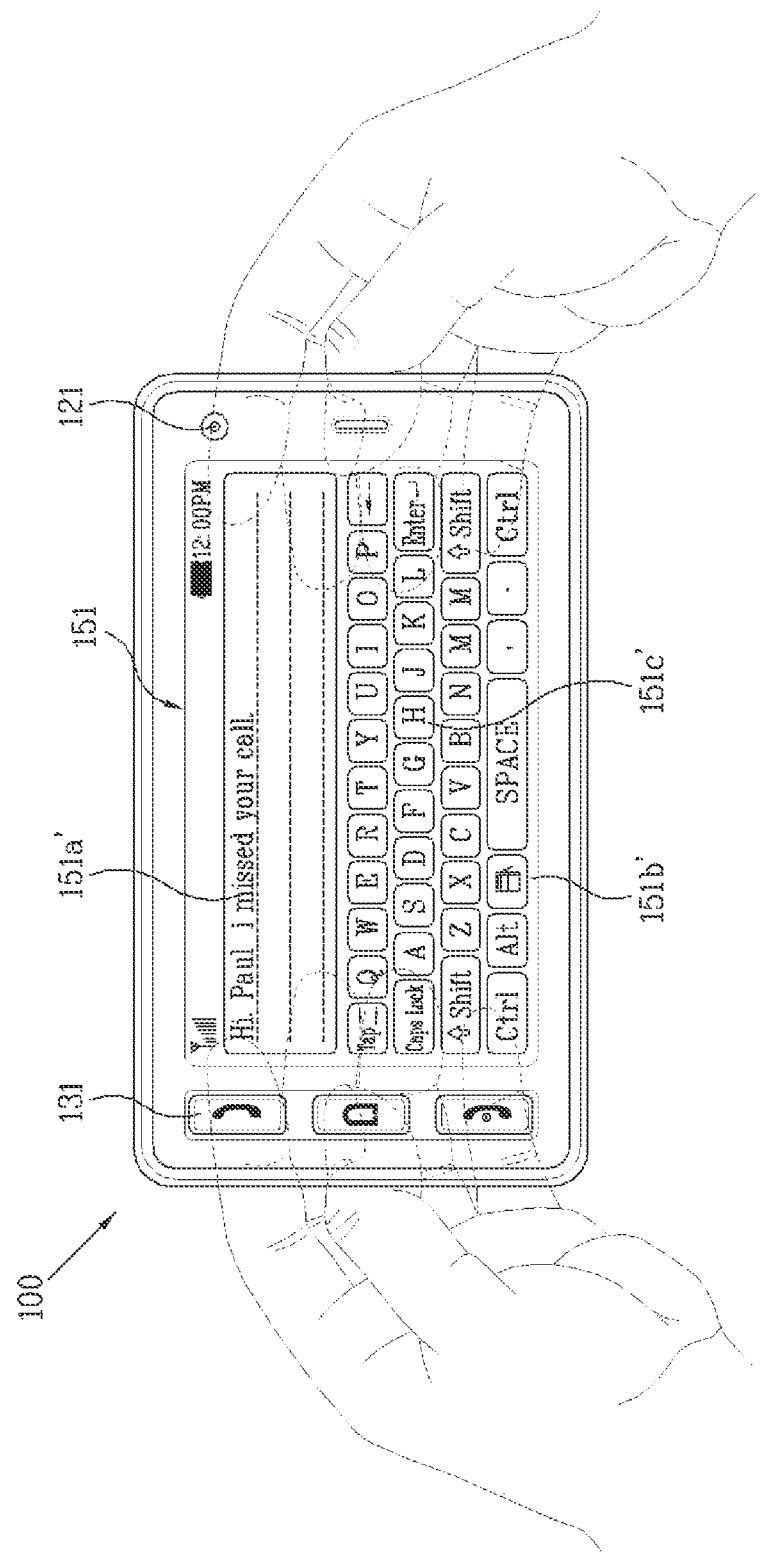

FIG. 2 and FIG. 3 are front-view diagrams of the mobile terminal 100 according to an embodiment of the present invention for explaining an operational state of the mobile terminal 100. Various types of visual information can be displayed on the display module 151. For example, the visual information can be displayed using characters, numerals, symbols, graphics, and icons.

In order to input the visual information, at least one of the characters, numerals, symbols, graphics and icons are represented as a single predetermined array to be implemented in a keypad formation. The keypad formation can be referred to as "soft keys."

FIG. 2 shows the mobile terminal 100 having a vertical configuration (i.e., portrait), and FIG. 3 shows mobile terminal 100 having a horizontal configuration (i.e., landscape). The display module 151 can be configured to change an output picture according to the arranged configuration of the mobile terminal 100.

Referring to FIG. 2, a mobile terminal 100 according to an embodiment of the present invention includes a first manipulating unit 131, an output window 151a, an input window 151b, and a plurality of soft keys 151c.

The display module 151 is operable through an entire area or through a plurality of regions. Each of the plurality of regions can be configured to be interoperable.

A front face of the mobile terminal 100 can receive an input by a touch applied to one of the plurality soft keys 151c. For example, the output window 151a and the input window 151b are displayed on the display module 151. The one of the plurality of soft keys 151c representing a digit for inputting a phone number is displayed on the input window 151b. If the one of the plurality of soft keys 151c is touched, a digit corresponding to the touched soft key is displayed on the output window 151a. If the first manipulating unit 131 is manipulated, a call connection for the phone number displayed on the output window 151a is performed.

Referring to FIG. 3, the mobile terminal 100 is configured in a text input mode. Accordingly, a rear face of the mobile terminal 100 can receive an input by a touch applied to one of the plurality of soft keys 151c'.

An output window 151a' and an input window 151b' are displayed on the display module 151. The plurality of soft keys 151c' representing at least one of characters, symbols and digits can be arranged in the input window 151b'. The soft keys 151c' can be arranged in a QWERTY key formation.

If the plurality of soft keys 151c' are touched through the touchpad, the characters, symbols and digits corresponding to the touched soft keys are displayed on the output window 151a'. Thus, the touch input via the touchpad is advantageous in that the plurality of soft keys 151c' can be prevented from being blocked by a finger when touched, unlike a touch input via the display module 151.

If the display module 151 and the touchpad are configured transparently, fingers located at the backside of the mobile terminal 100 can be seen. Hence, more correct touch inputs are possible.

The display module 151 or the touchpad can be configured to receive a touch input by a scrolling function. A user scrolls the display module 151 or the touchpad to shift a cursor or pointer located at an entity (e.g., icon) displayed on the display module 151. If a finger is shifted on the display module 151 or the touchpad, a path of the shifted finger can be visually displayed on the display module 151. This may be useful in editing an image displayed on the display module 151.

When the display module 151, such as a touchscreen, and the touchpad are touched together (e.g., clamped by a user using a thumb and a first finger) within a predetermined time range, the mobile terminal 100 can execute a function. For example, the function can include activation or deactivation of the display module 151 or the touchpad.

Figure 4:
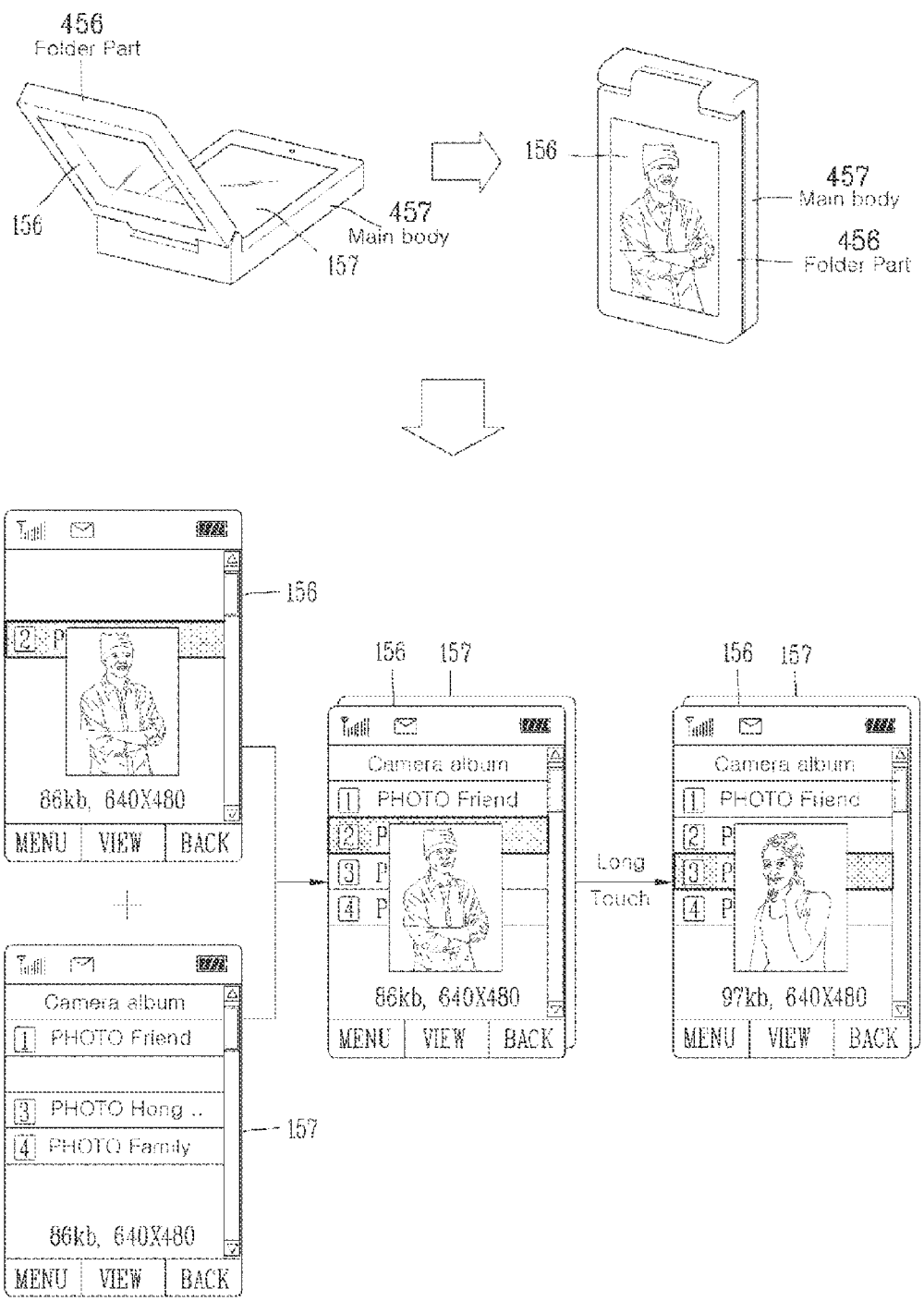
FIG. 4 is a diagram to explain the concept of a method of controlling a touch action on a pair of displays overlapped with each other according to an embodiment of the present invention.

FIG. 4 is a conceptual diagram of an exemplary method of controlling a touch action when the display modules 156 and 157 are overlapped with each other according to an embodiment of the present invention. Referring to FIG. 4, the mobile terminal 100 is a folder type mobile terminal in which a folder part 456 is connected to a main body 457 of the mobile terminal 100 such that they may be folded or unfolded.

A first display module 156 provided on the folder part 456 is a light-transmittive or transparent type display such as a transparent organic light-emitting diode display (TOLED), while a second display module 157 provided on the main body 457 may be a non-transmittive type such as a liquid crystal display (LCD). The first display module 156 and second display module 157 can each include a user input unit 130 for sensing, such as a touchscreen.

If a touch (e.g., a contact touch or a proximity touch) is applied to the first display module 156 (hereinafter "TOLED 156") and detected, the controller unit 180 selects or runs at least one image from an image list displayed on the TOLED 156 according to a touch type and a touch duration. A method of controlling information displayed on a different display or the second display module 157 (hereinafter "LCD 157"), when a touch to the externally exposed TOLED 156 in an overlapped configuration is disclosed. The description is made with reference to touch input types classified into a touch input, a long touch input, and a drag touch input. A long touch is a touch lasting at least 2 seconds.

In the overlapped configuration (i.e., when the mobile terminal 100 is closed or folded), the TOLED 156 is configured to be overlapped with the LCD 157. In this state, if a long touch is detected, the controller unit 180 enables at least one image to be selected from an image list displayed on the LCD 157 according to the received input type. A result output from running the selected image is displayed on the TOLED 156.

The long touch input is used to selectively shift a specific number of entities displayed on the LCD 157 to the TOLED 156, such that an action for running a corresponding entity can be excluded. For example, if a user provides a long touch input on a prescribed region of the TOLED 156 corresponding to a specific entity of the LCD 157, the controller unit 180 controls the corresponding entity to be displayed by shifting it to the TOLED 156.

Meanwhile, an entity displayed on the TOLED 156 can be displayed by shifting the entity to the LCD 157 according to a prescribed touch input (e.g., flicking, swirling) sensed at the TOLED 156. For example, a second menu displayed on the LCD 157 is displayed by shifting the second menu to the TOLED 156.

If another input, such as a drag touch input, is additionally detected with a long touch input, the controller unit 180 executes a function associated with an image selected by the long touch input so that a preview of the selected image can be displayed on the TOLED 156. For example, a preview of a selected image (e.g., picture of a male) related to a second menu (e.g., image file) is performed.

While the preview is being displayed and a drag touch input toward a different image is additionally performed on the TOLED 156 by maintaining the long touch input, the controller unit 180 shifts a selection cursor or a selection bar of the LCD 157 to display the different image selected by the selection cursor on the preview (e.g., picture of female). Following completion of the touch input types (e.g., long touch input and drag touch input), the controller unit 180 displays the initial image selected by the long touch input.

A touch action, which combines the long touch input and drag touch input, is identically applied when a slide action is detected together with a long proximity touch (e.g., a proximity touch maintained for at least 2 or 3 seconds) on the TOLED 156. The controller unit 180 can operate in a manner similar to a general touch controlling method when other touch actions are detected.

The method of controlling the touch action in the overlapped configuration is applicable to a mobile terminal having a single display. Further, a method of controlling the touch action in the overlapped configuration is applicable to mobile terminals distinct from folder-type terminals having dual displays.

According to an embodiment of the present invention, the mobile terminal 100 can display an object using a three-dimensional (3-D) polyhedron. For example, the mobile terminal 100 displays the 3-D polyhedron having a specific number of facets such that a display target object is designated to each facet of the 3-D polyhedron with a display target object displayed on each designated facet of the 3-D polyhedron.

In some examples, the display target object may mean a target that can be represented on each facet of the polyhedron. For example, the display target object can include menu item information (e.g., menu name, menu icon, menu image), state information of the mobile terminal 100 (e.g., battery information, signal strength information, and memory information), image data (e.g., photo file, video file, video call captured photo/video, and broadcast capture photo/video), audio data (e.g., MP3 file, call recording, and speech message), widget data (e.g., stock information, weather information, scheduling management information, today's news). The display target object can target all information displayable on a screen of the mobile terminal 100. Moreover, the display target object can be displayed in various ways including a text, an image, an icon, an animation, a flash, and a symbol.

FIGS. 5A to 5D are diagrams of screen configurations for displaying a display target object using a 3-D polyhedron according to an embodiment of the present invention. For clarity and convenience of the following description, a display target object can be limited to menu item information.

Figure 5A:
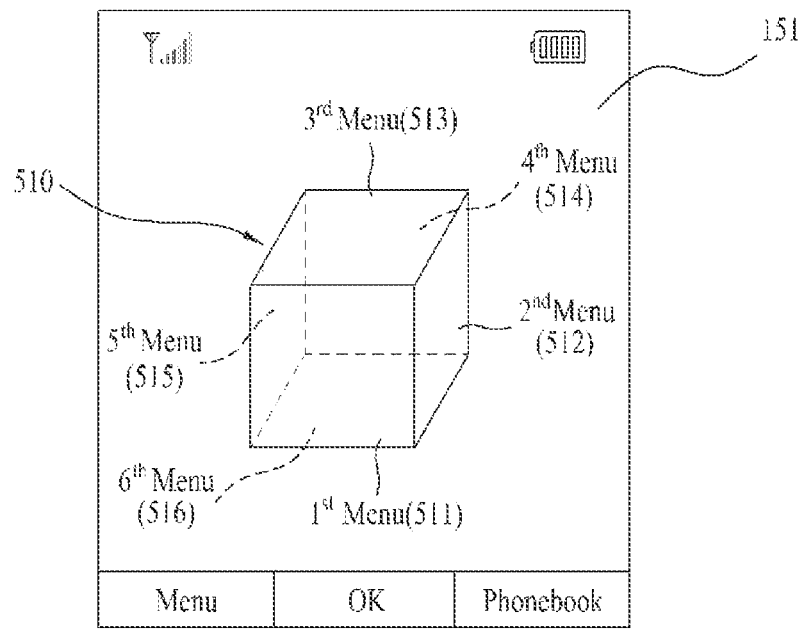
FIGS. 5A to 5D are diagrams of screen configurations for displaying a display target object using a 3-D polyhedron according to an embodiment of the present invention.
Figure 5B:
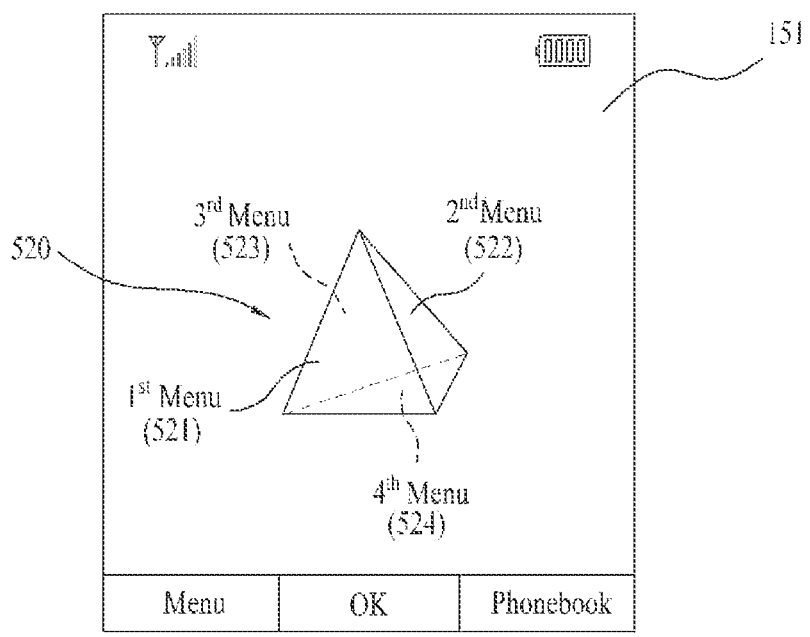

Referring to FIG. 5A, the mobile terminal 100 can display menu item information on each facet of a 3-D polyhedron having a polyhedral shape corresponding to a specific number of menu items. If there are six menu items, the mobile terminal 100 determines that a hexahedron 510 (i.e., a six-sided polyhedron) can display menu item information on facets 511-516 of the hexahedron 510 such that each menu item is displayed on a designated facet. Referring to FIG. 5B, if there are four menu items, the mobile terminal 100 determines that a tetrahedron 520 (i.e., a four-side polyhedron) can display menu item information on facets 521-524 of the tetrahedron 520 such that each menu item is displayed on a designated facet.

Figure 5C:
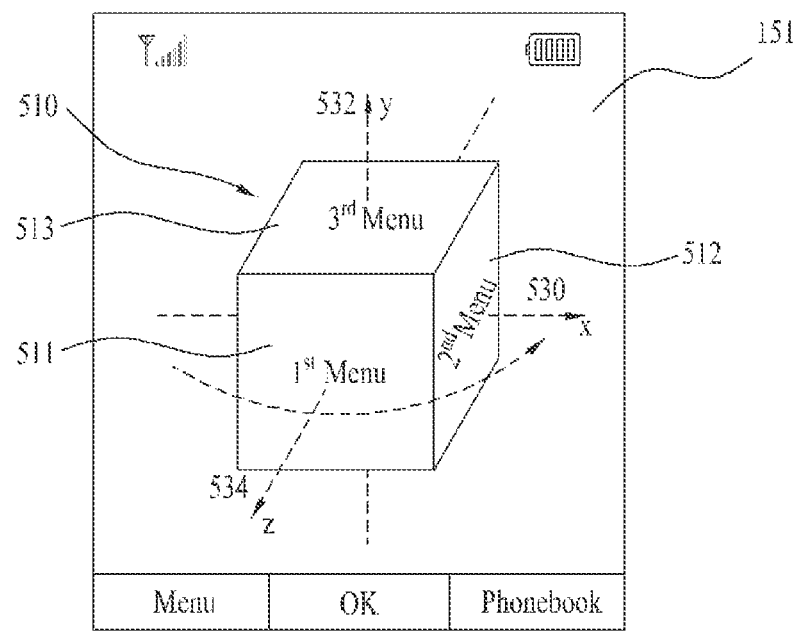

Referring to FIG. 5C, the mobile terminal 100 can rotationally display a polyhedron having menu item information represented on each facet of the polyhedron. If the polyhedron 510 is rotated at a predetermined speed in a predetermined direction, the mobile terminal 100 can sequentially arrange each of the facets 511-516 of the polyhedron 510 facing forward on the display module 151.

Figure 5D:
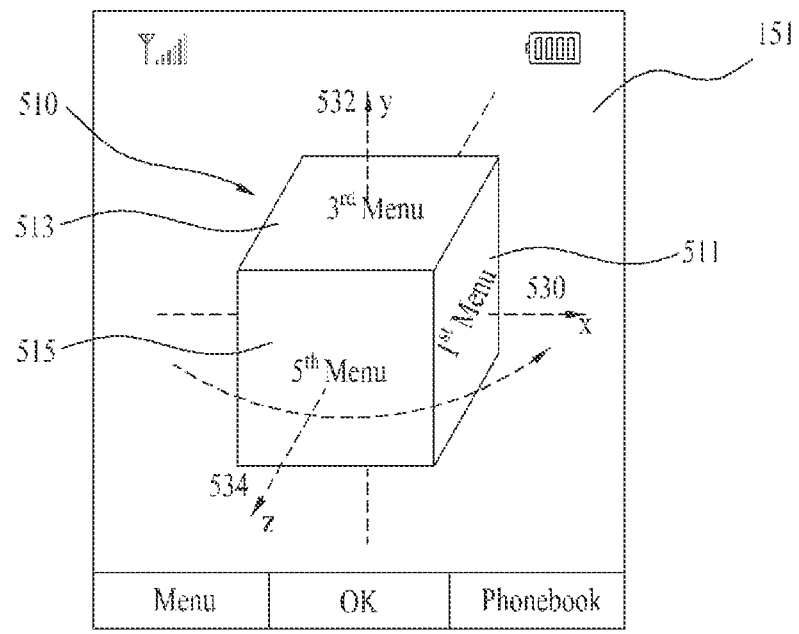

For example, the polyhedron 510 can rotate along the y-axis 532 such that the polyhedron 510 switched from menu item 512 (e.g., $2^{nd}$ Menu) to menu item 511 (e.g., $1^{st}$ Menu). Referring to FIG. 5D, the polyhedron 510 further rotates along the y-axis to switch from menu item 511 to menu item 515 (e.g., $5^{th}$ Menu).

Figure 6:
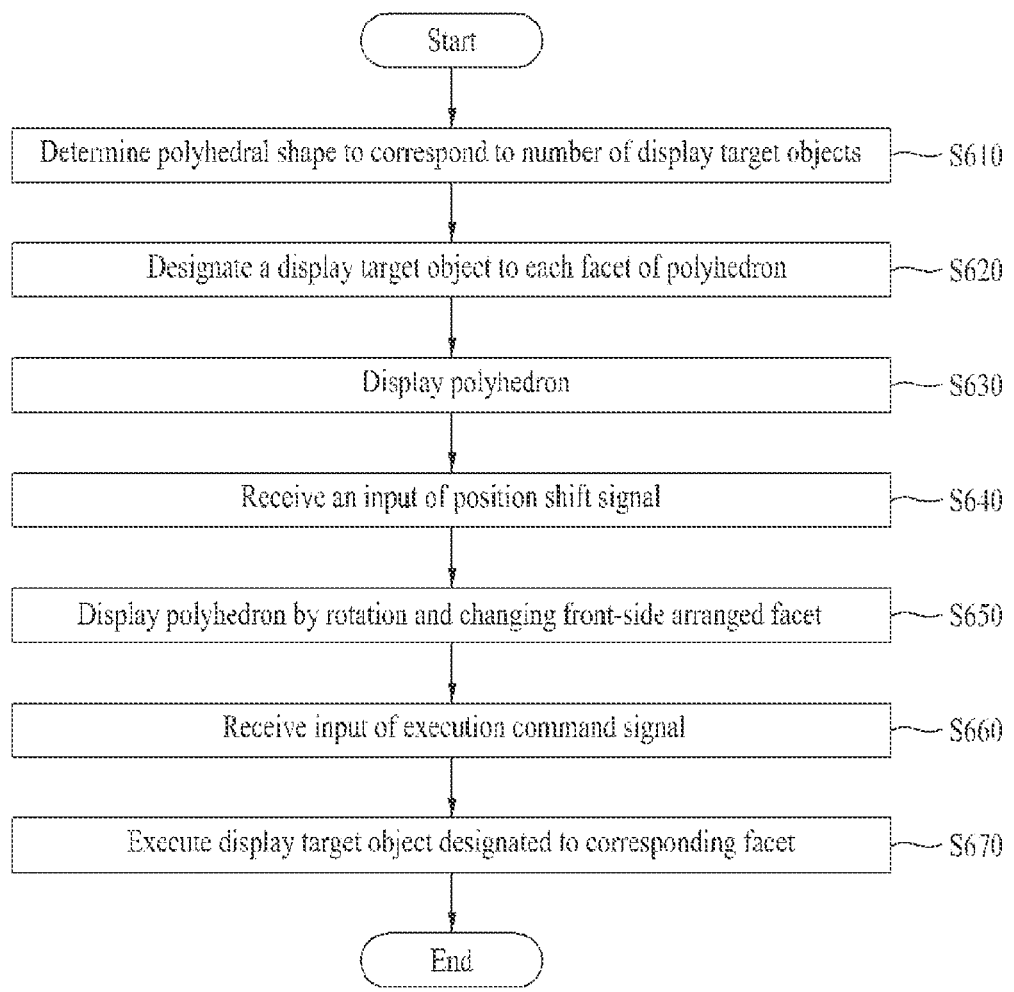
FIG. 6 is a flowchart for a method of controlling a display in a mobile terminal according to an embodiment of the present invention.

FIG. 6 is a flowchart for a method of controlling a display in a mobile terminal 100 according to an embodiment of the present invention. The mobile terminal 100 determines a polyhedral shape under the control of the controller unit 180 to correspond to a number of display target objects [S610]. The controller unit 180 can determine the polyhedral shape to have the same number of facets as the display target objects so that each display target object is displayed on one facet of a polyhedron.

For example, if there are three display target objects, the controller unit 180 can determine a circular cylinder as the polyhedral shape. If there are four display target objects, the controller can determine a triangular pyramid as the polyhedral shape. If there are five display target objects, the controller can determine a quadrangular pyramid as the polyhedral shape. If there are six display target objects, the controller can determine a hexahedron as the polyhedral shape.

If the number of display target objects that are displayed on one facet of a polyhedron is two, then the controller unit 180 can determine a polyhedral shape having facets equal to half of the number of display target objects.

If the number of display target objects is 2N+1, a polyhedral shape having N+1 facets (i.e., "N" is a positive integer) can be determined. Moreover, if N display target objects are displayed on one facet of a polyhedron and (N+a) display target objects are displayed on another facet of the polyhedron (i.e., "N" is a positive integer and "a" is a positive integer), the controller unit 180 can determine a polyhedral shape having N display target objects displayed on one facet of a polyhedron and (N+a) display target objects displayed on another facet of the polyhedron.

Meanwhile, if one facet is necessary to display a display target object, the controller unit 180 can determine a polyhedron (e.g., a cone) having a minimum number of facets to configure a polyhedron.

Under the control of the controller unit 180, a display target object is designated to each facet of the polyhedron having the determined polyhedral shape. The mobile terminal 100 can randomly designate a display target object that will be displayed on each facet of the polyhedron [S620].

Further in the designating method step S620, the mobile terminal 100 can receive an input of a designation signal of a display target object for each facet of the polyhedron from an external environment or a user and the controller unit 180 can designate a display target object to each facet of the polyhedron to correspond to the input designation signal.

Under the control of the controller unit 180, the mobile terminal 100 can display the polyhedron three-dimensionally while having the display target objects designated to the facets via the display module 151 [S630].

Figure 7A:
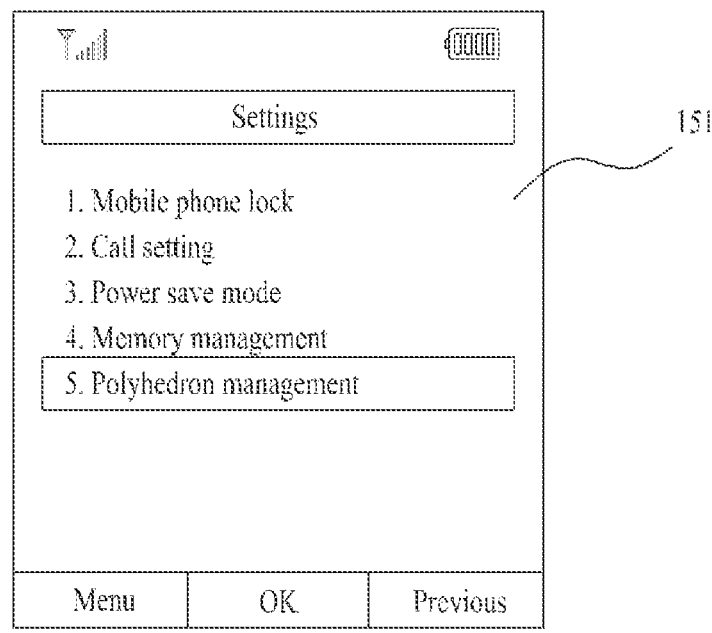
FIGS. 7A to 7C are diagrams of screen configurations for designating a display target object to each facet of a polyhedron according to an embodiment of the present invention.

Referring to FIG. 7A, a menu item (e.g., polyhedron management) that corresponds to a function for designating a display target object to each facet of a polyhedron can be selected via a menu search, and the mobile terminal 100 can set a display target object designation available state. The display target object designation available state provides information about which facets of the polyhedron are available for designation. The display target object designation available state can be set when a key or a key region of a touchscreen that is related to designating a display target object to each facet of a polyhedron is selected.

Figure 7B:
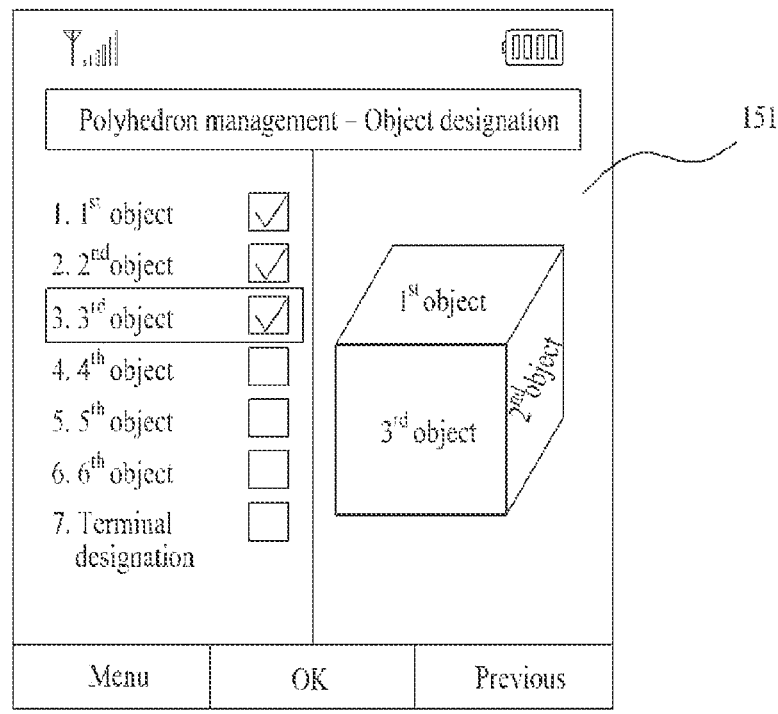

Referring to FIG. 7B, as the display target object designation available state is set, the mobile terminal 100 can display an object list on a first portion of a screen and a polyhedron on a second portion of the screen. The polyhedral shape can be determined based on the number of display target objects constructing the object list.

Figure 7C:
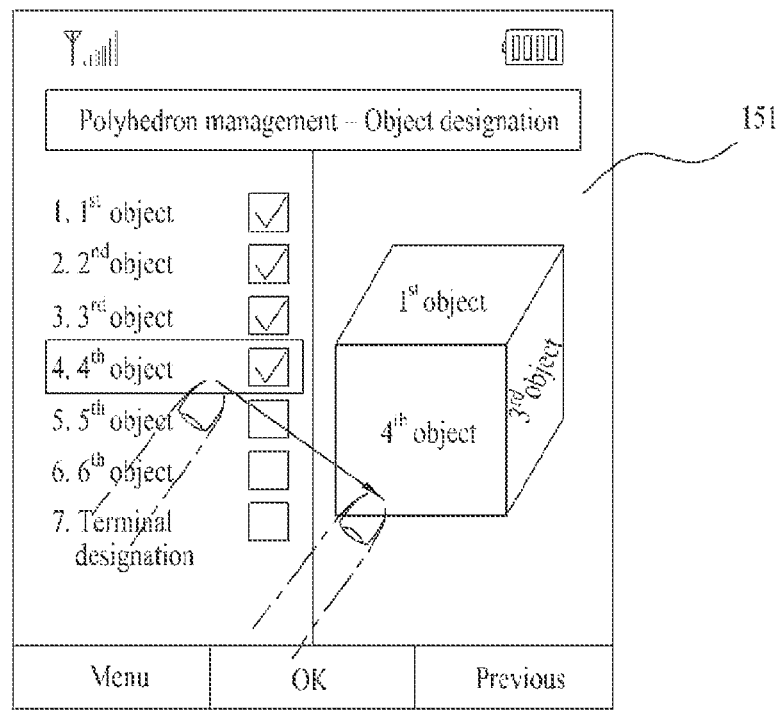

For example, if a corresponding facet is designated to each display target object via a user's key manipulation, as illustrated in FIG. 7B, or a multi-touch input (e.g., touch & drag) between the display target object and the corresponding facet, the controller unit 180 can designate the touched & dragged display target object to the corresponding facet, as illustrated in FIG. 7C. In another example, if a terminal designation is selected from the object shown in FIG. 7B, the controller unit 180 can randomly designate a corresponding facet according to a display target object.

FIGS. 8A to 8H are diagrams of screen configurations for displaying menu item information using a polyhedron if a display target object is the menu item information. For clarity and convenience of the following description, it is assumed that a polyhedral shape determined to correspond to the number of display target objects is a hexahedron. Additionally, it is assumed that the menu item information is a menu name.

Figure 8A:
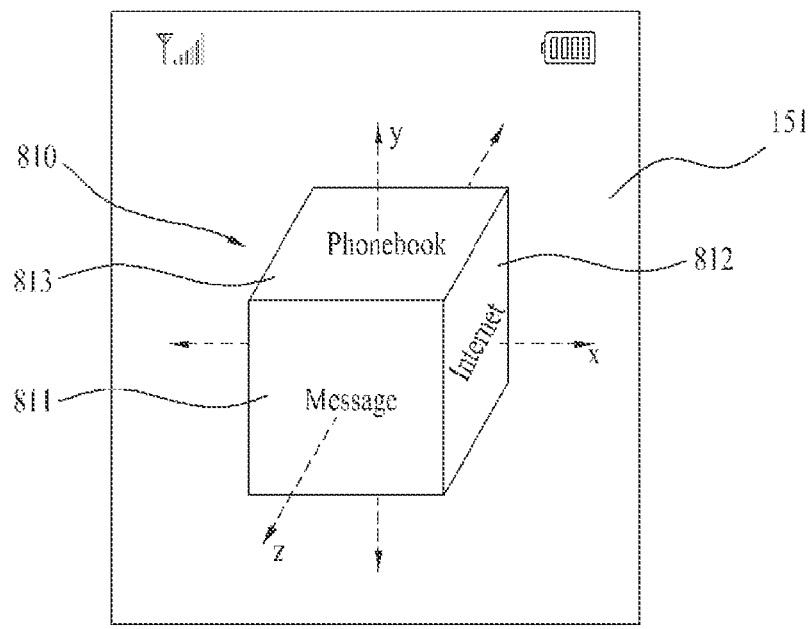
FIGS. 8A to 8H are diagrams of screen configurations for displaying menu item information using a polyhedron if a display target object is the menu item information according to an embodiment of the present invention.

Referring to FIG. 8A, the mobile terminal 100 can display a polyhedron 810 in three dimensions (i.e., along x, y, and z axis) and can display menu names, such as a message menu item 811, Internet menu item 812, and phonebook menu item 813, designated to facets of the polyhedron 810. For example, the mobile terminal 100 can display a menu name designated to a facet that is visible on the polyhedron 810 when displayed on the display module 151.

Figure 8B:
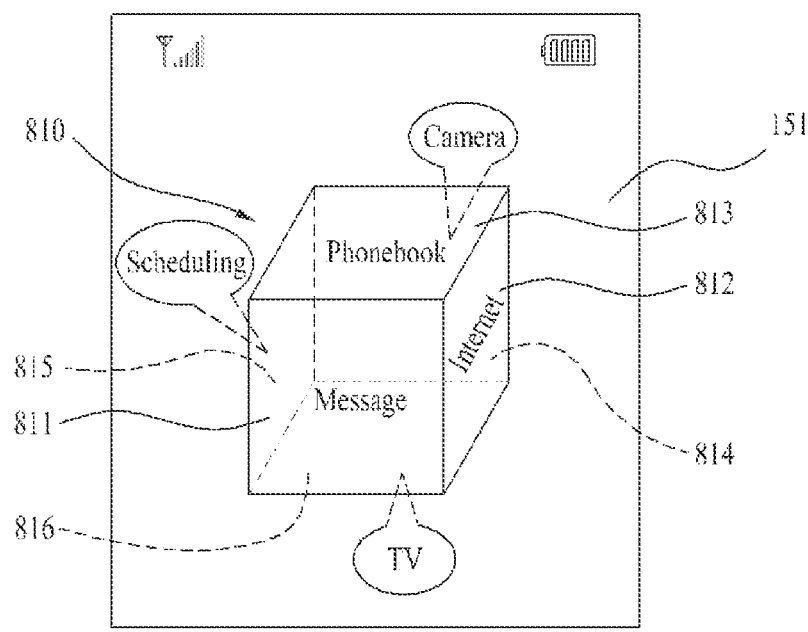

Referring to FIG. 8B, the mobile terminal 100 can display menu names, such as a camera, scheduling, and TV, designated to facets 814-816 that are not visible on the polyhedron 810 but are labeled with visible word balloons. Accordingly, the combination of visible facets (e.g., facets 811-813) and visible word balloons corresponding to non-visible facets (e.g., facets 814-816) provides a user with menu names designated to all facets of the polyhedron 810.

Figure 8C:
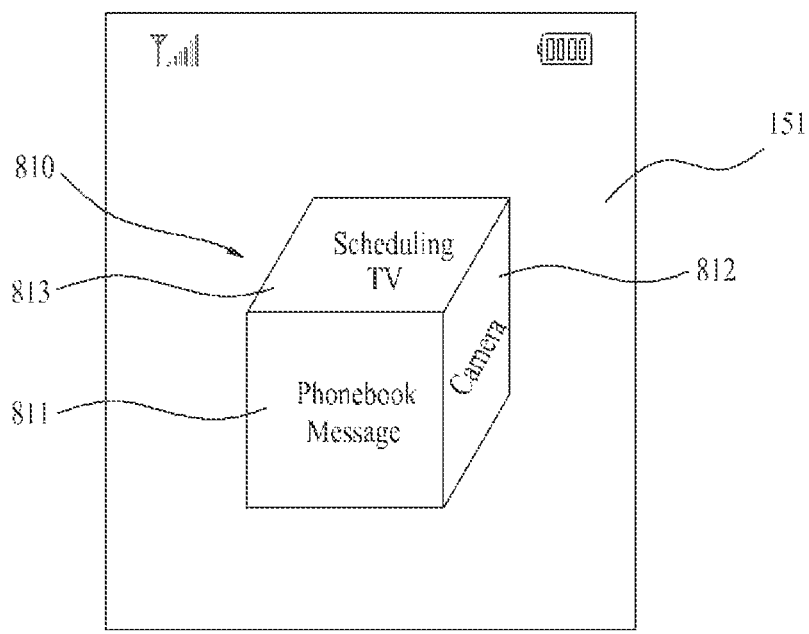

Referring to FIG. 8C, the mobile terminal 100 can display at least one display target object by designating the at least one display target object to one facet of a polyhedron. For example, multiple display target objects such as phonebook and message menu items can be designated to a first facet 811. Additionally, a single display target object such as a camera menu item can be designated to a second facet 812. Further, two display target objects such as scheduling and television (TV) menu items can be designated to a third facet 813.

Figure 8D:
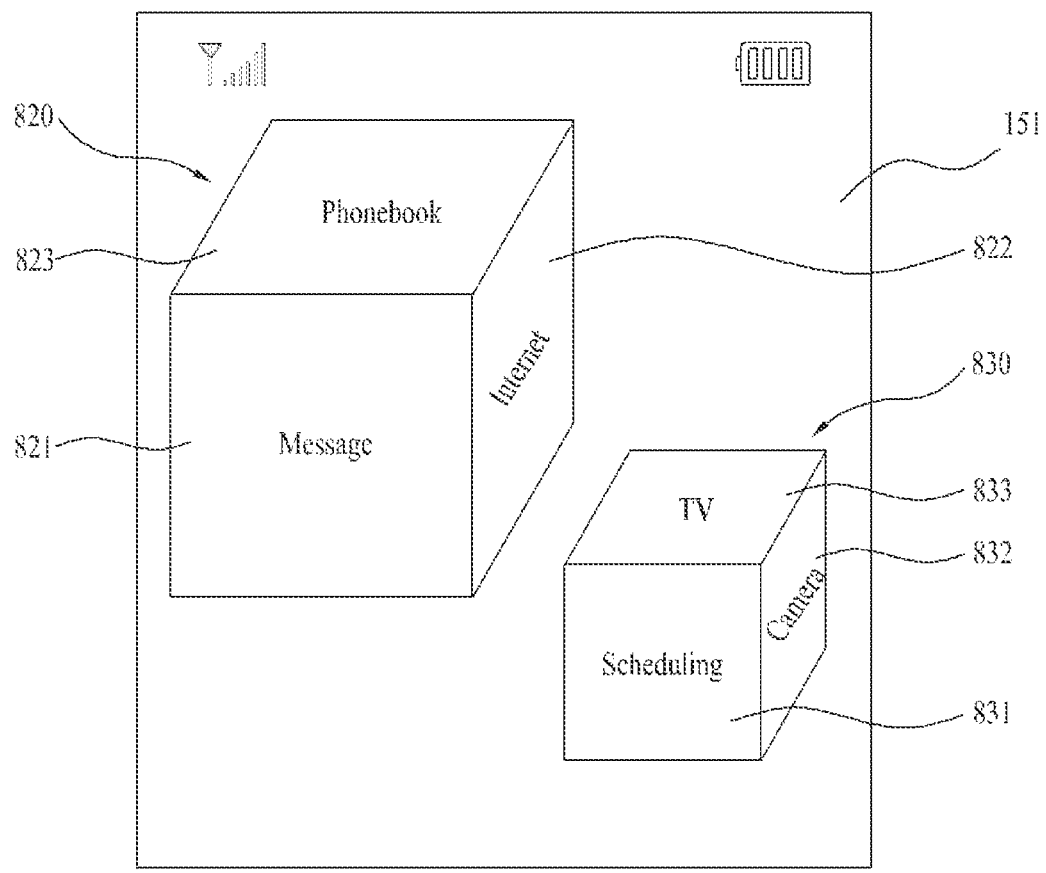

Referring to FIG. 8D, a plurality of polyhedrons can be displayed on the same screen. Different menu names can be displayed on facets of a plurality of polyhedrons.

For example, menu names of menu items can be displayed on facets of first and second polyhedrons 810 and 830. Menu names, such as a message menu item 821, Internet menu item 822, and phonebook menu item 823, of first upper menu items can be displayed on the facets of the first polyhedron 820. Additionally, menu names, such as a scheduling menu item 831, camera menu item 832, and TV menu item 833, of second upper menu items can be displayed on the facets of the second polyhedron 830.

The first polyhedron 810 can construct a primary polyhedron and the second polyhedron 830 can construct a subordinate polyhedron. Menu names of upper menu items can be displayed on facets of the first polyhedron 810. Additionally, menu names of subordinate menu items corresponding to an upper menu item which is designated to one facet of the first polyhedron 810 can be displayed on facets of the second polyhedron 830. The same menu names can be displayed on the facets of the first polyhedron 820 and second polyhedron 830, such that the first polyhedron 820 can be displayed with an enlarged polyhedron shape and the second polyhedron 830 can be displayed with a reduced polyhedron shape.

A plurality of polyhedrons can exchange or shift their display positions among each other according to a user's selection (not shown). Alternatively, a plurality of polyhedrons can be displayed such that menu names designated on facets of the plurality of polyhedrons can be exchanged among each other (not shown).

Figure 8E:
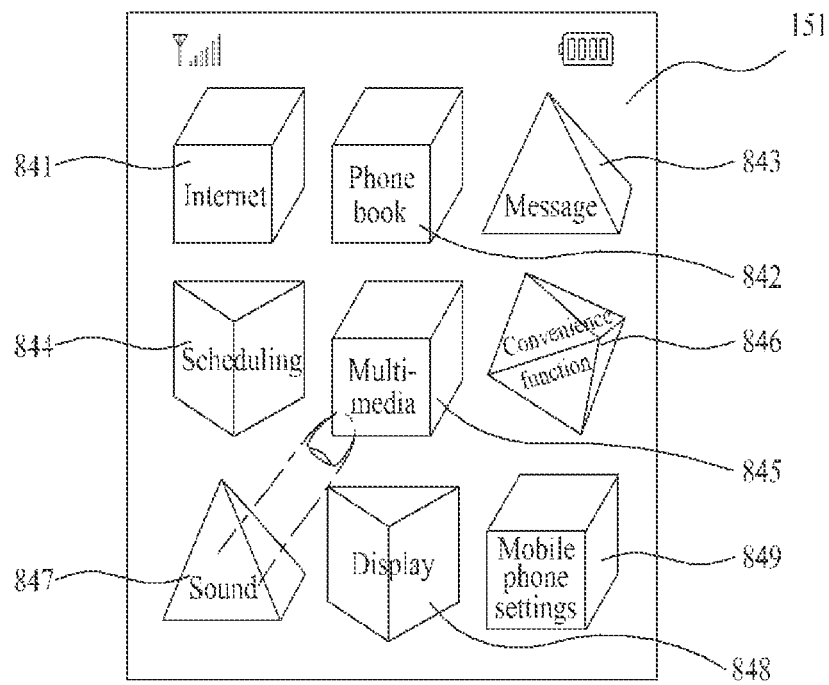

Referring to FIG. 8E, the mobile terminal 100 can display a plurality of polyhedrons 841-849 corresponding to upper menus in an upper menu display mode. Menu names of the upper menus are displayed on the plurality of polyhedrons 841-849, such as an Internet menu item 841, phonebook menu item 842, message menu item 843, scheduling menu item 844, multimedia menu item 845, convenience function menu item 846, sound menu item 847, display menu item 848, and mobile phone settings menu item 849.

Names of submenu items belonging to each of the upper menus can be displayed on facets of the corresponding polyhedron (not shown). Moreover, a polyhedral shape of each of the polyhedrons 841-849 can be determined according to the number of submenu items belonging to the corresponding upper menu.

Figure 8F:
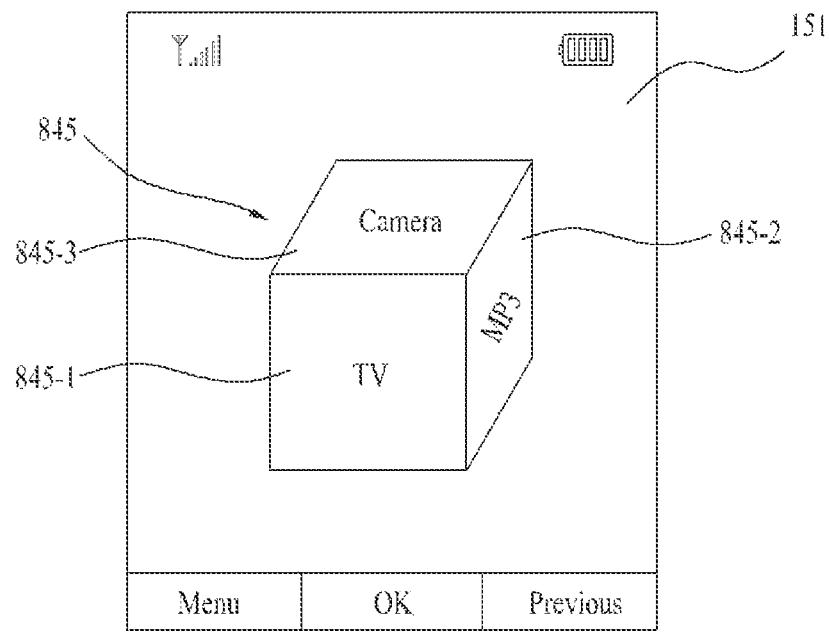

Referring to FIG. 8F, if the fifth polyhedron 845 is selected in FIG. 8E, the mobile terminal 100 can display menu names, such as a TV menu item 845-1, MP3 menu item 845-2, and camera menu item 845-3, for submenu items related to the multimedia menu item 845, as illustrated in FIG. 8E. Additionally, the multimedia menu item 845 can be displayed in an enlarged size for viewing and manipulating the polyhedron when the multimedia submenu items are selected.

Figure 8G:
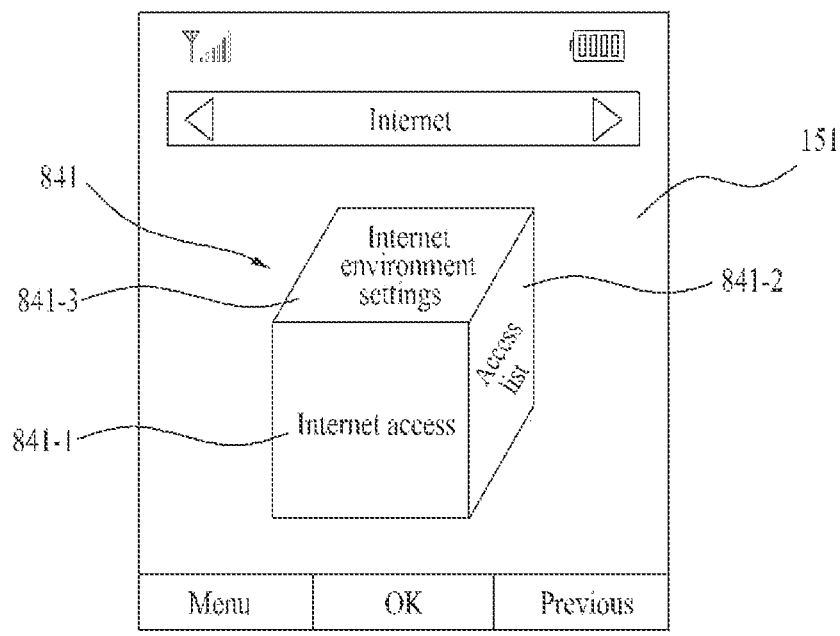

Referring to FIG. 8G, the mobile terminal 100 can sequentially display a polyhedron corresponding to each upper menu in an upper menu display mode. For example, a page-turning action can be performed to display the Internet menu item 841 in the upper menu display mode. Accordingly, menu names of submenu items belonging to the corresponding upper menu can be displayed on facets of the polyhedron displayed on the display module 151.

Figure 8H:
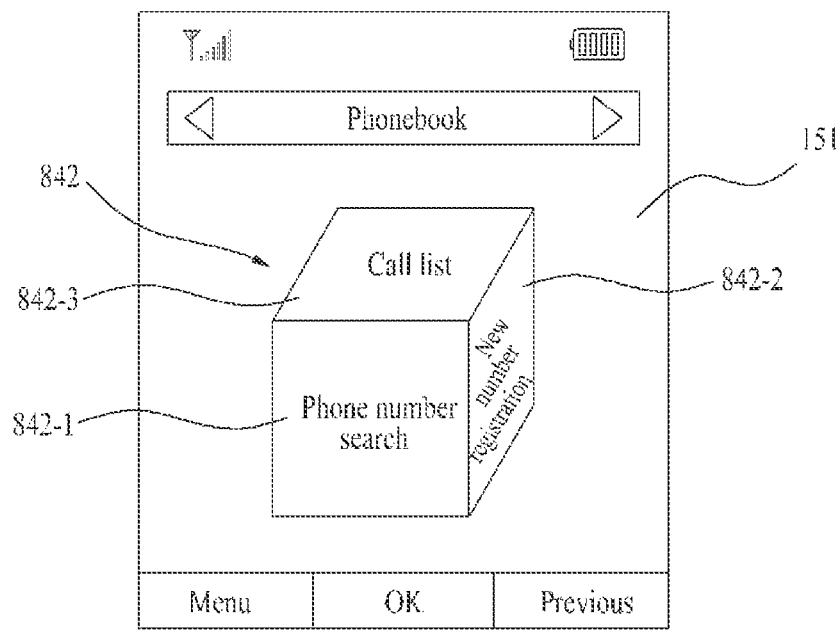

For example, the Internet menu item 841 can display an Internet access menu item 841-1, an access list menu item 841-2, and an Internet environment settings menu item 841-3. In another example, the phonebook menu item 842 can display a phone number search menu item 842-1, a new number registration menu item 842-2, and a call list menu item 842-3, as illustrated in FIG. 8H. The upper menu display mode can display the polyhedron in an enlarged size for viewing and manipulating the polyhedron when selecting among the submenu items of the corresponding upper menu.

FIGS. 9A to 9D are diagrams of screen configurations for displaying image data using a polyhedron if a display target object is determined to be the image data according to the present invention. For clarity and convenience of the following description, it is assumed that a polyhedral shape determined to correspond to the number of display target objects is a hexahedron. Additionally, it is assumed that the image data is a photo or an image.

Figure 9A:
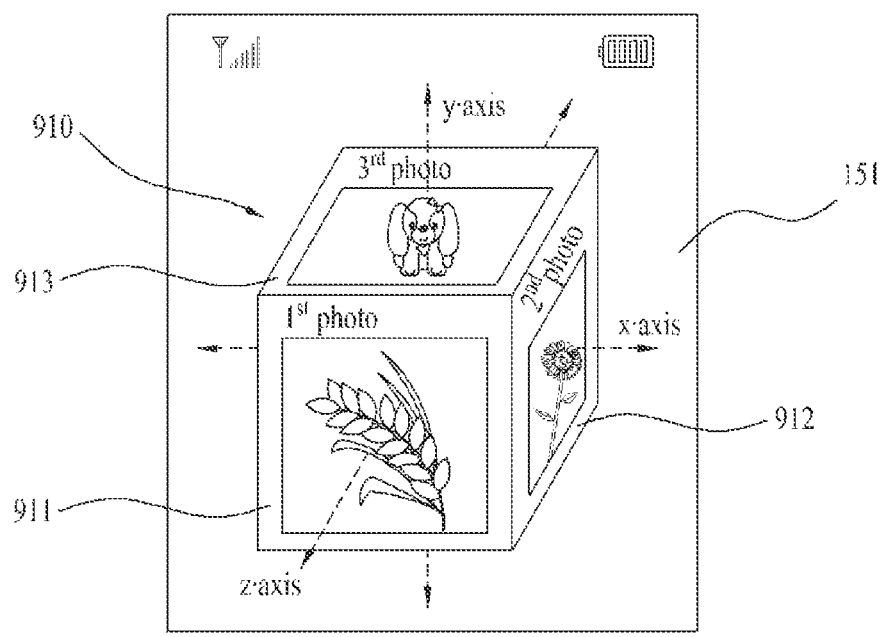
FIGS. 9A to 9D are diagrams of screen configurations for displaying image data using a polyhedron if a display target object is the image data according to an embodiment of the present invention.

Referring to FIG. 9A, the mobile terminal 100 displays a hexahedron 910 in three dimensions (e.g., x-axis, y-axis and z-axis) and can display photos, such as a first photo 911, second photo 912 and third photo 913, designated to facets of the polyhedron 910. The mobile terminal 100 can display a photo designated to a corresponding facet visible on the polyhedron.

Figure 9B:
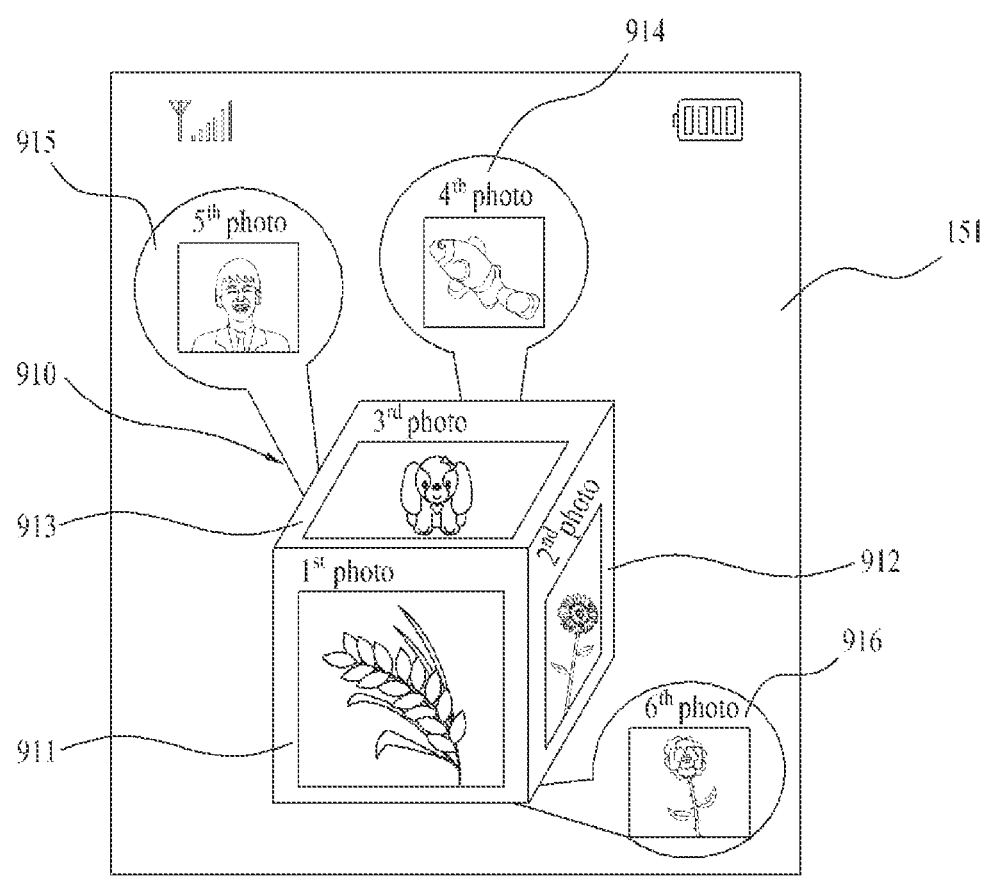

Referring to FIG. 9B, the mobile terminal 100 can display photos, such as a fourth photo 914, fifth photo 915 and sixth photo 916, designated to facets not visible on the polyhedron 910. However, labels, such as word balloons, can be displayed in conjunction with the non-visible facets 914-916 in order to provide a user with notice of the photos designated to all facets of the polyhedron.

Figure 9C:
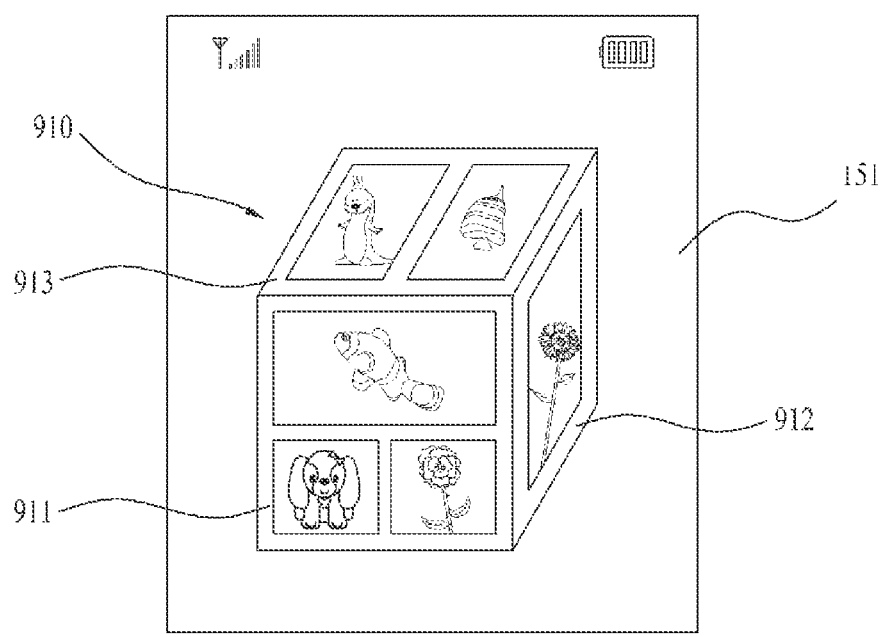

Referring to FIG. 9C, the mobile terminal 100 can display at least one photo by designating one or more photos to one facet of a polyhedron. For example, a total of three photos can be designated to a first facet 911.

One photo can be designated to a second facet 912. Two photos can be designated to a third facet 913. Fewer or a greater number of photos can be displayed on each facet of the polyhedron as long as the photos are legible for display.

Figure 9D:
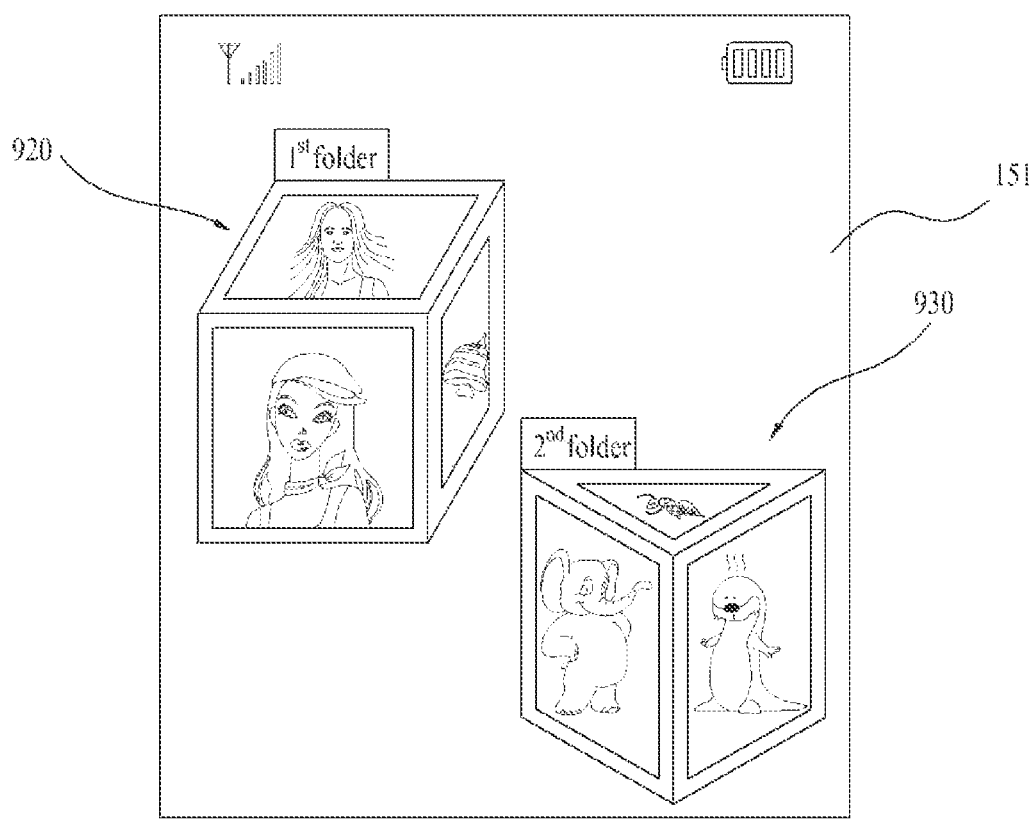

Referring to FIG. 9D, a plurality of polyhedrons can be displayed on the display module 151. Different photos can be displayed on facets of the plurality of polyhedrons.

For example, the plurality of polyhedrons can include first and second polyhedrons 920 and 930 to display photos stored in different photo folders located in memory unit 160. In another example, at least one photo file stored in a first photo folder can be displayed on facets of the first polyhedron 920. Additionally, at least a photo file stored in a second photo folder can be displayed on facets of the second polyhedron 930.

The first polyhedron 920 can construct a main polyhedron and the second polyhedron 930 can construct a sub-polyhedron. For example, photo folder names can be displayed on facets of the main polyhedron and photos that belong to a photo folder displayed on the main polyhedron can be displayed on facets of the sub-polyhedron.

In other examples, photos belonging to the same photo folder can be displayed on facets of the first and second polyhedrons 920 and 930. Alternatively, the first polyhedrons 920 can display photos different than the photos displayed on the second polyhedron 930.

Moreover, a plurality of polyhedrons can exchange, shift or rotate display positions with other polyhedrons according to a user's selection received by user input unit 130 (not shown). Alternatively, a plurality of polyhedrons can exchange photos designated to facets of the plurality of the polyhedrons with other polyhedrons (not shown).

Figure 10:
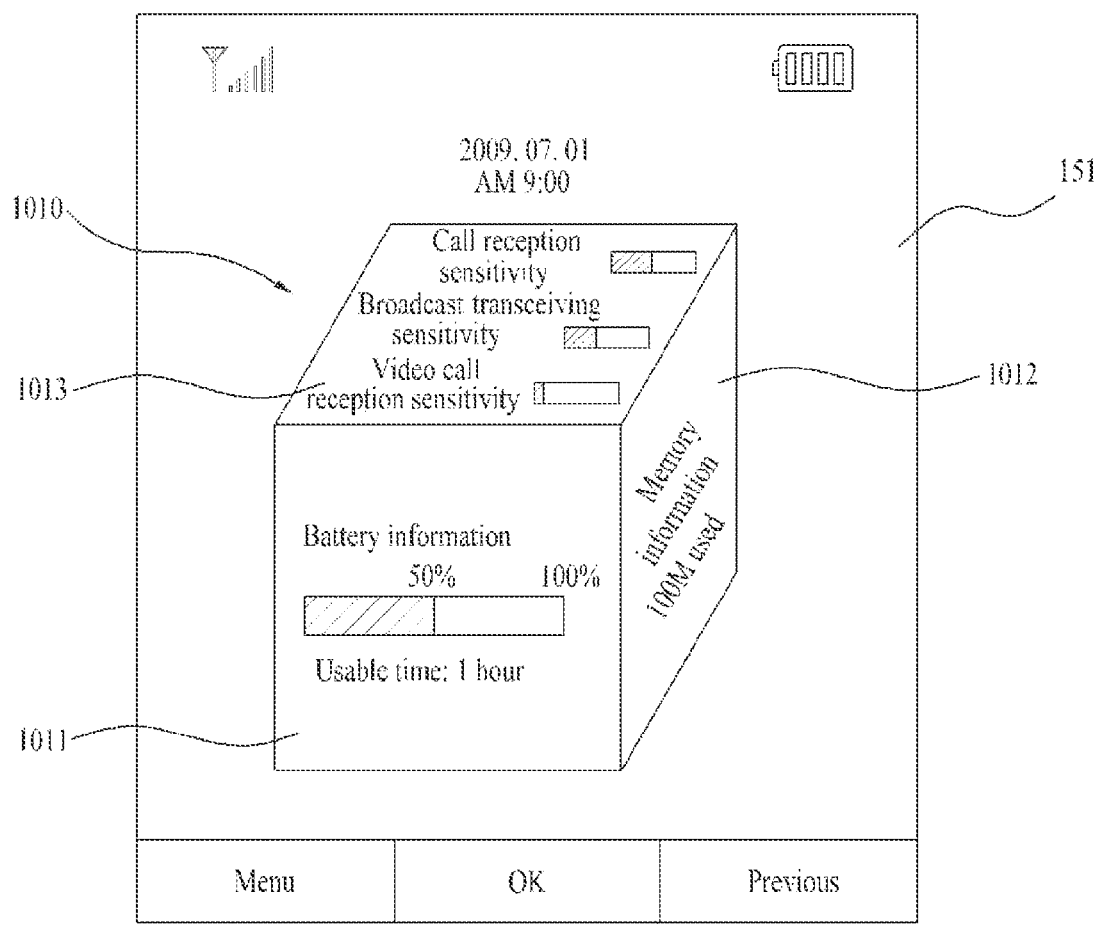
FIG. 10 is a diagram of screen configuration for displaying terminal state information using a polyhedron if a display target object is the terminal state information according to an embodiment of the present invention.

FIG. 10 is a diagram of screen configuration for displaying terminal state information using a polyhedron if a display target object is the terminal state information according to an embodiment of the present invention. For clarity and convenience of the following description, it is assumed that a polyhedral shape of the polyhedron is a hexahedron.

Referring to FIG. 10, the mobile terminal 100 can display a hexahedron 1010 in three dimensions and can display terminal state information, such as battery information 1011, memory information 1012, and receive sensitivity information 1013, designated to facets of the hexahedron 1010. The mobile terminal 100 can display the terminal state information on a facet visible on the hexahedron 1010 displayed on the display module 151.

Figure 11:
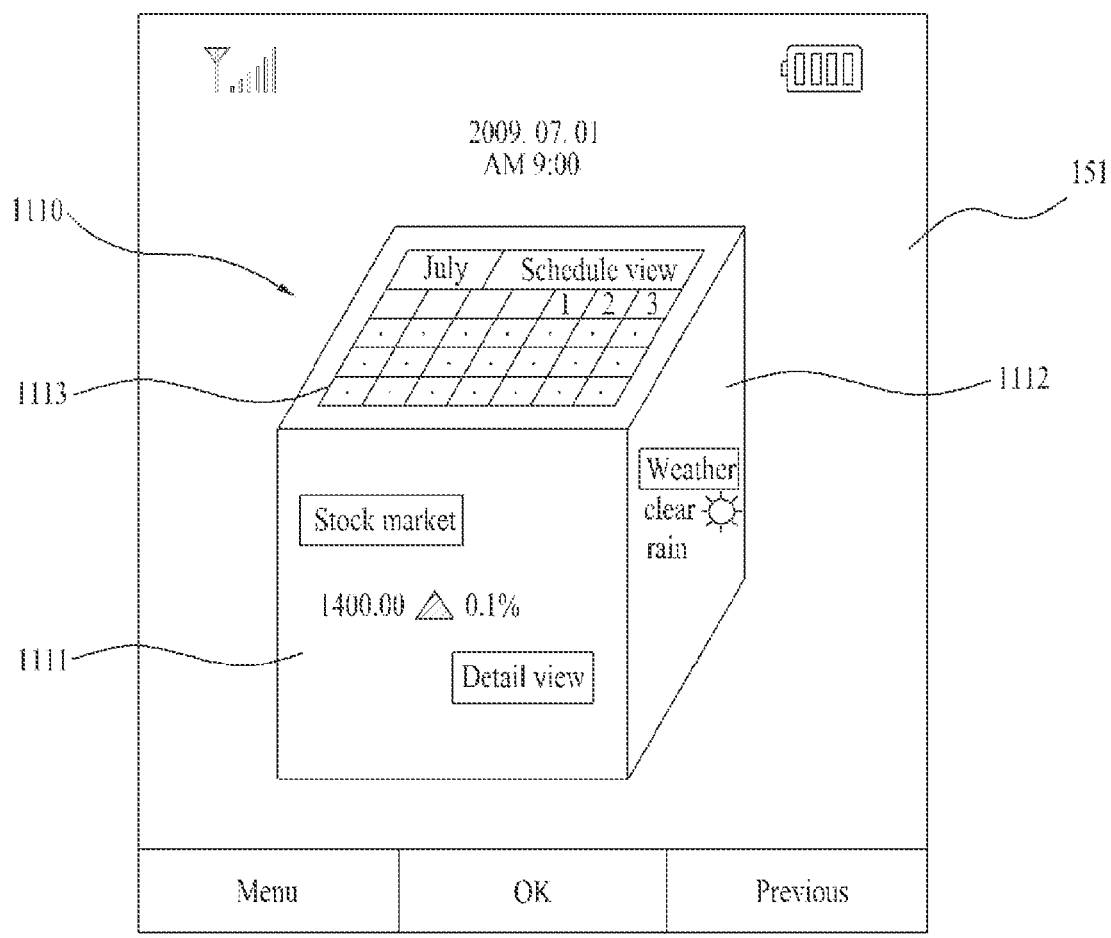
FIG. 11 is a diagram of screen configuration for displaying widget data using a polyhedron if a display target object is the widget data according to an embodiment of the present invention.

FIG. 11 is a diagram of screen configuration for displaying widget data using a polyhedron if a display target object is the widget data according to an embodiment of the present invention. Referring to FIG. 11, the mobile terminal 100 can display a hexahedron 1110 in three dimensions and can display widget data, such as stock information 1111, weather information 1112, and schedule information 1113, designated to facets of the hexahedron 1110.

The mobile terminal 100 can display the widget data on a facet visible on the hexahedron 1110 displayed on the display module 151. When the terminal state information and the widget data are displayed on faces of the polyhedron, the mobile terminal 100 can provides portions of the widget data on facets not visible on the polyhedron, display a plurality of display target objects on one facet of the polyhedron, or display a plurality of polyhedrons encompassing the widget data.

Referring to FIG. 6 with respect to displaying the polyhedron [S630], the mobile terminal 100 can rotationally display a polyhedron in three dimensions, in which display target objects are designated to facets of the polyhedron under control of the controller unit 180. When rotationally displaying the polyhedron, the mobile terminal 100 can display the polyhedron such that the polyhedron is rotated at a predetermined speed in a predetermined direction to enable each facet of the polyhedron to be sequentially arranged on visible portions of the polyhedron. Therefore, the mobile terminal 100 can provide a user with a view of all display target objects designated to the facets of the polyhedron.

The mobile terminal 100 can display a polyhedron capable of rotation so that the polyhedron can be automatically rotated without a rotation command signal input from the user input unit 130. Alternatively, if a rotation command signal is input via the user input unit 130, then the mobile terminal 100 can rotationally display a polyhedron.

The rotation command signal can be input when a touch action related to a rotation command signal input, such as a touch & drag, a touch having a predetermined time/distance/pressure/size, a multi-touch using plural fingers, or a touch with a specific pattern, is received from the user input unit 130. The rotation command signal may be input via a specific key or a key region corresponding to the rotation command signal input or a menu item selected by a user.

When an input related to a rotation change signal from a user is received via the user input unit 130 during a rotational display of a polyhedron, the mobile terminal 100 can change a rotational direction or speed of the polyhedron to correspond to the received rotation change signal. For example, the received rotation change signal can include a rotational direction change signal to change a first rotational direction to a second rotational direction or include a rotational speed change signal to change a first rotational speed to a second rotational speed.

For clarity and convenience of the following description, it is assumed that a polyhedral shape of the polyhedron is a hexahedron. Additionally, a display target object can be limited to a menu name of menu item information. In some embodiments, image data, audio data, widget data, or terminal state information can be applicable to the display target object.

Figure 12A:
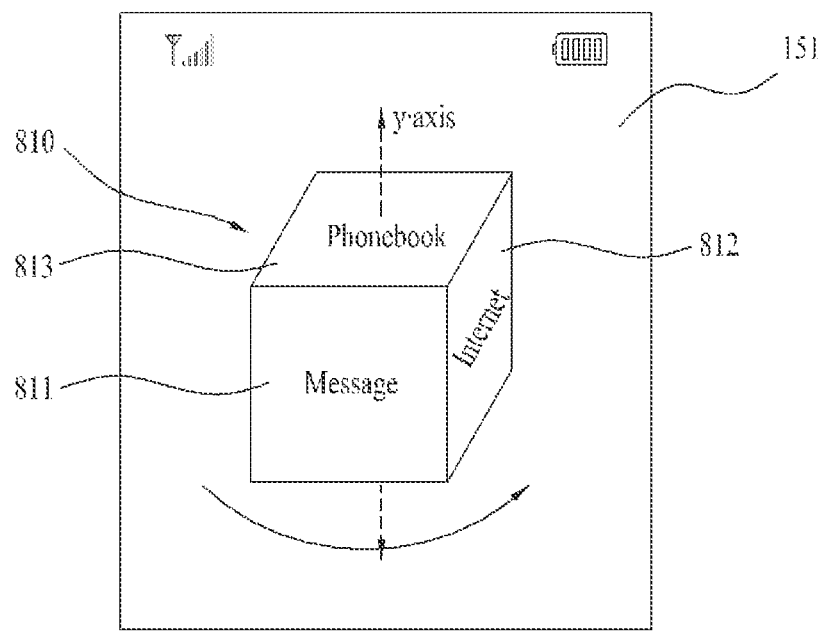
FIGS. 12A to 12D are diagrams of screen configurations for displaying a polyhedron rotationally according to an embodiment of the present invention.

FIGS. 12A to 12D are diagrams of screen configurations for displaying a polyhedron rotationally according to an embodiment of the present invention. Referring to FIG. 12A, the mobile terminal 100 can display a polyhedron 810 in three dimensions on display module 151 that rotates at a predetermined speed in a rightward or leftward direction (i.e., along the y-axis). The polyhedron 810 can be rotated in the x-axis or z-axis.

Since the polyhedron 810 is rotating at the predetermined speed in either the rightward direction or leftward direction, facets located adjacently to the right or left of a facet in a front-view side can be sequentially arranged to the front-view side after rotation of the polyhedron 810. For example, the polyhedron 810 in a starting position displays a message menu item 811, an Internet menu item 812 and a phonebook menu item 813.

Figure 12B:
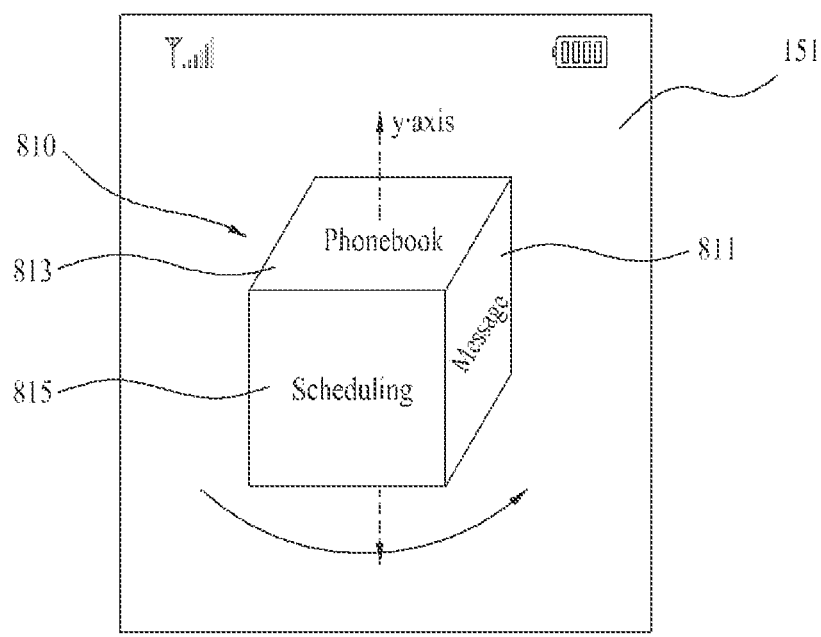

When the polyhedron 810 is rotated to the right along the y-axis, a scheduling menu item 815 appears on the front-view side and the message menu item 811 is sequentially arranged to an adjacent position after rotation of the polyhedron 810, as illustrated in FIG. 12B. The phonebook menu item 813 remains in the same position since the polyhedron 810 is rotated along the y-axis which alters the viewing positions of the message menu item 811 and the scheduling menu item 815. Therefore, a user can view menu names designated to the facets located right or left of the front-view side of the polyhedron 810 when the polyhedron 810 is manipulated by at least right or left rotations selected by the user.

Figure 12C:
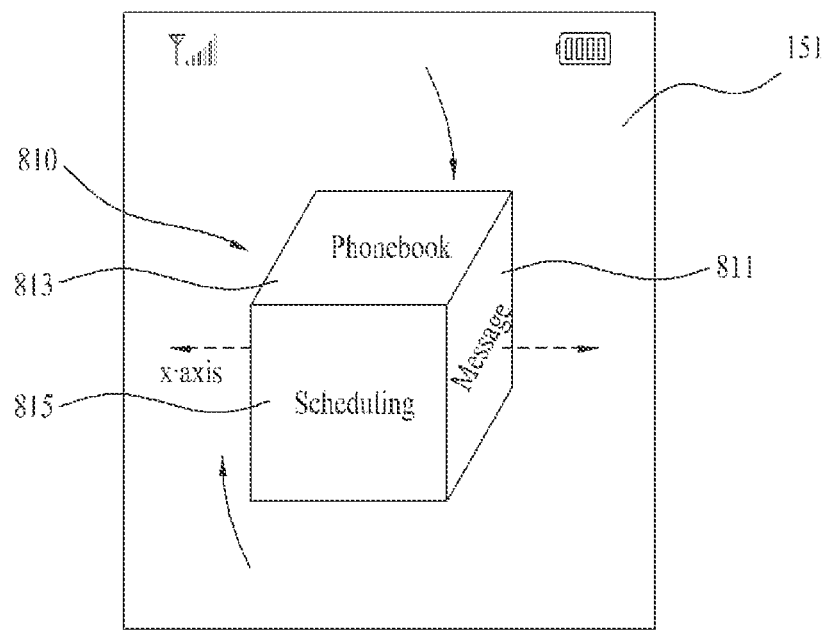

Referring to FIG. 12C, the mobile terminal 100 can display the polyhedron 810 in three dimensions on display module

151 that rotates at a predetermined speed in an upward or downward direction (i.e., along the x-axis) polyhedron 810. Since the polyhedron 810 is rotating at the predetermined speed in either the top direction or bottom direction, facets located adjacently above or below of a facet in a front-view side can be sequentially arranged to the front-view side after rotation of the polyhedron 810. For example, the polyhedron 810 in a starting position displays a message menu item 811, a phonebook menu item 813 and a scheduling menu item 815.

Figure 12D:
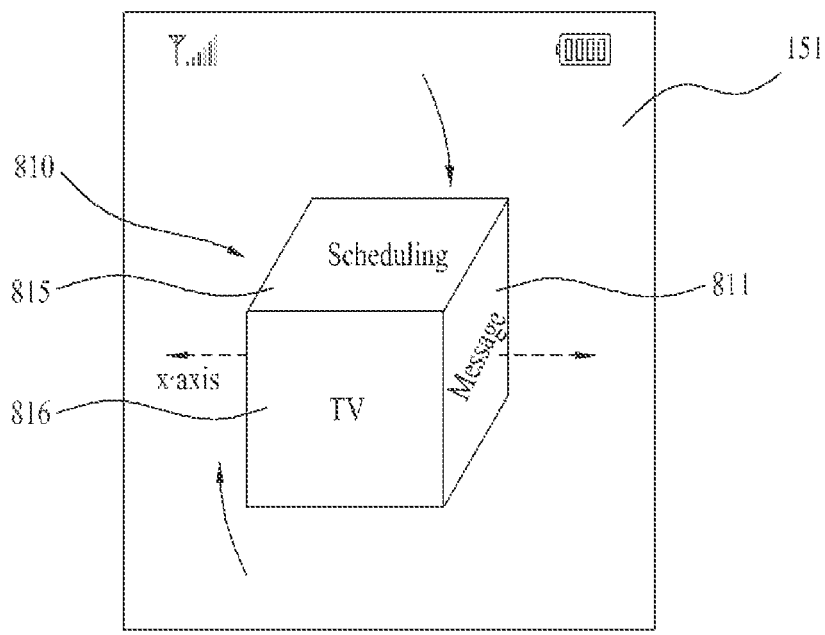

When the polyhedron 810 is rotated to the top along the x-axis, a television (TV) menu item 816 appears on the front-view side and the scheduling menu item 815 is sequentially arranged to an adjacent position after rotation of the polyhedron 810, as illustrated in FIG. 12D. The message menu item 811 remains in the same position since the polyhedron 810 is rotated along the x-axis which alters the viewing positions of the phonebook menu item 813 and the scheduling menu item 815. Therefore, a user can view menu names designated to the facets located above and below the front-view sided facet of the polyhedron 810 when the polyhedron 810 is manipulated by at least upward or downward rotations selected by the user.

In some embodiments, the mobile terminal 100 can have a polyhedron change viewing positions in a rightward or leftward direction by one rotation or in an upward or downward direction by one rotation. In other embodiments, the mobile terminal 100 can repeatedly perform the rotations, and therefore, a user can be provided with menu names designated to all facets of the polyhedron 810.

In other embodiments, if a rotational direction change signal for a left direction is input when a rotational display of the polyhedron 810 in a rightward direction is performed, the mobile terminal 100 can perform a rotational display in the left direction by changing a rotational direction of the polyhedron 810 (not shown). For example, the rotational direction change signal for the left direction can be input when a touch & drag input for a left direction rotation is received from a user via the user input unit 130.

In still other embodiments, if a rotational speed change signal is input when a rotational display of the polyhedron 810 in a rightward direction is performed, the mobile terminal 100 can change a rotational speed by maintaining the rotational display of the polyhedron 810 in the rightward direction (not shown). For example, the rotational speed change signal can request to increase the speed of rotation in the rightward direction when a touch & drag input in the rightward direction received from a user via the user input unit 130 is detected at a predetermined speed or higher. The rotational speed change signal can include a request to reduce the rotational speed of the polyhedron 810 when a touch & drag input in the rightward direction received from a user via the user input unit 130 is detected at the predetermined speed or lower.

Figure 13A:
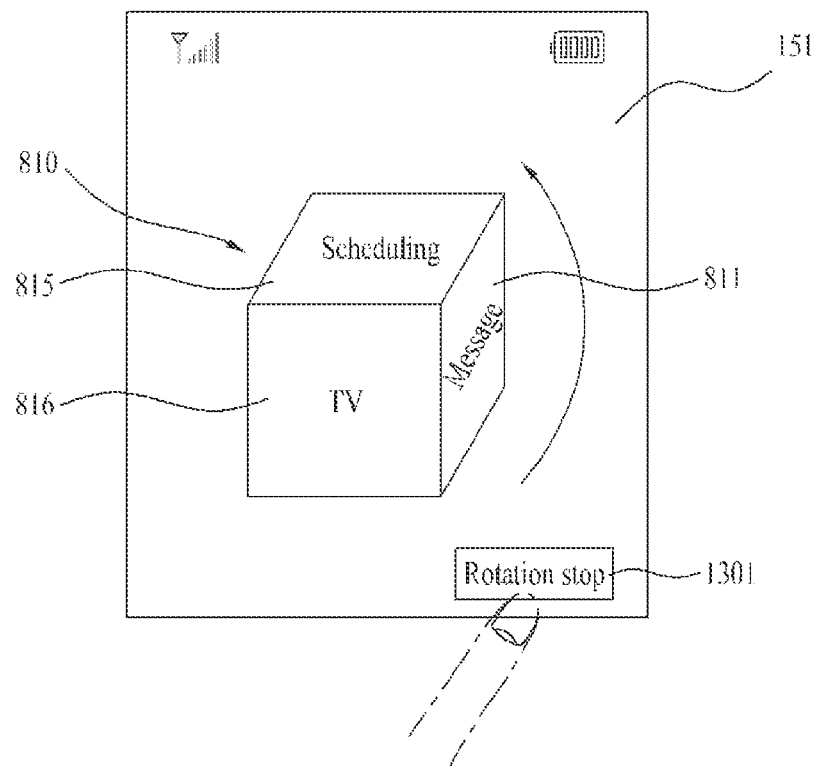
FIG. 13A and FIG. 13B are diagrams of screen configurations for stopping a rotational display of a polyhedron according to an embodiment of the present invention.
Figure 13B:
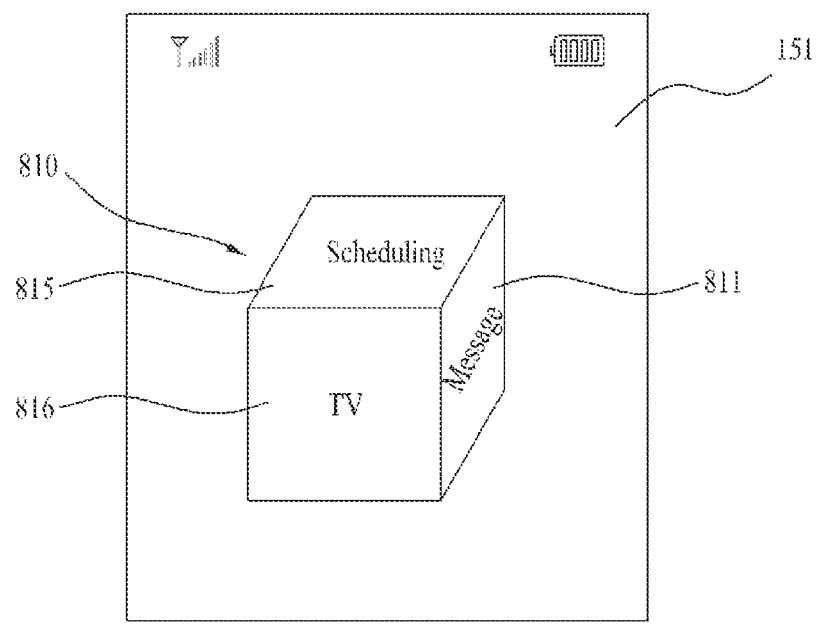

FIG. 13A and FIG. 13B are diagrams of screen configurations for stopping a rotational display of the polyhedron 810 according to an embodiment of the present invention. When an input requesting to stop rotation of the polyhedron 810 is received via the user input unit 130, as illustrated in FIG. 13A, the mobile terminal 100 can stop the rotational display of the polyhedron 810, as illustrated in FIG. 13B.

Referring to FIG. 13A, a rotation stop signal can be input via the user input unit 130. For example, the rotation stop signal can be detected through a key region 1301 labeled "Rotation stop" provided on display module 151, a key or menu item selected by a user, or a touch action, such as a touch & drag input received from a user at a predetermined speed or higher in a direction opposite to a current rotational direction of the polyhedron 810.

When stopping the rotation display of the polyhedron 810, the mobile terminal 100 can display a pattern related to the reduced speed of the rotation of the polyhedron 810. This can be referred to as "a stop by inertia."

Moreover, the mobile terminal 100 can automatically stop the rotational display of the polyhedron 810 after a predetermined duration of time. For example, the predetermined duration of time can be designated by a user selection or can be randomly designated by the mobile terminal 100 (not shown).

Referring to FIG. 6, the mobile terminal 100 can receive a position shift signal via the user input unit 130 for the displayed polyhedron [S640]. Under the control of the controller unit 180, the mobile terminal 100 can change a facet position on a front-view of the polyhedron by rotating the polyhedron at a predetermined angle to correspond to the received position shift signal [S650].

The position shift signal can include a signal to change the polyhedron by a polyhedron scroll or by a polyhedron rotation. For example, the position shift signal by the polyhedron scroll may be defined as a shift of a first facet to a position of a second facet as selected by a user. In another example, the position shift signal by the polyhedron rotation may be defined as enabling a specific facet of the polyhedron to be arranged at the front-view of the polyhedron.

FIGS. 14A to 14E are diagrams of screen configurations for scrolling a polyhedron to correspond to a polyhedron scroll signal according to an embodiment of the present invention.

Figure 14A:
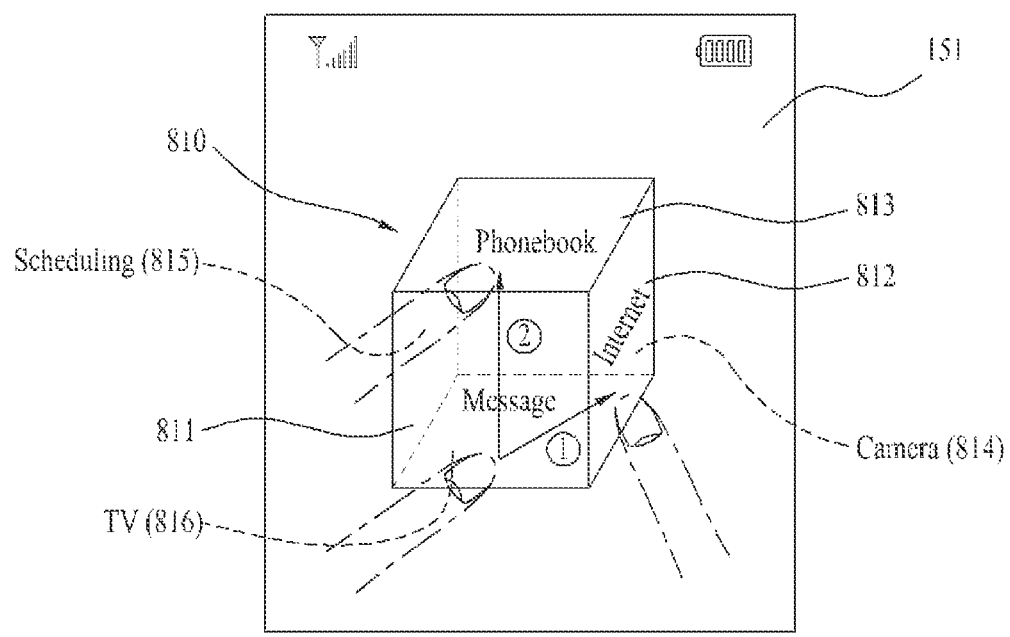
FIGS. 14A to 14E are diagrams of screen configurations for scrolling a polyhedron to correspond to a position shift signal according to an embodiment of the present invention.
Figure 14B:
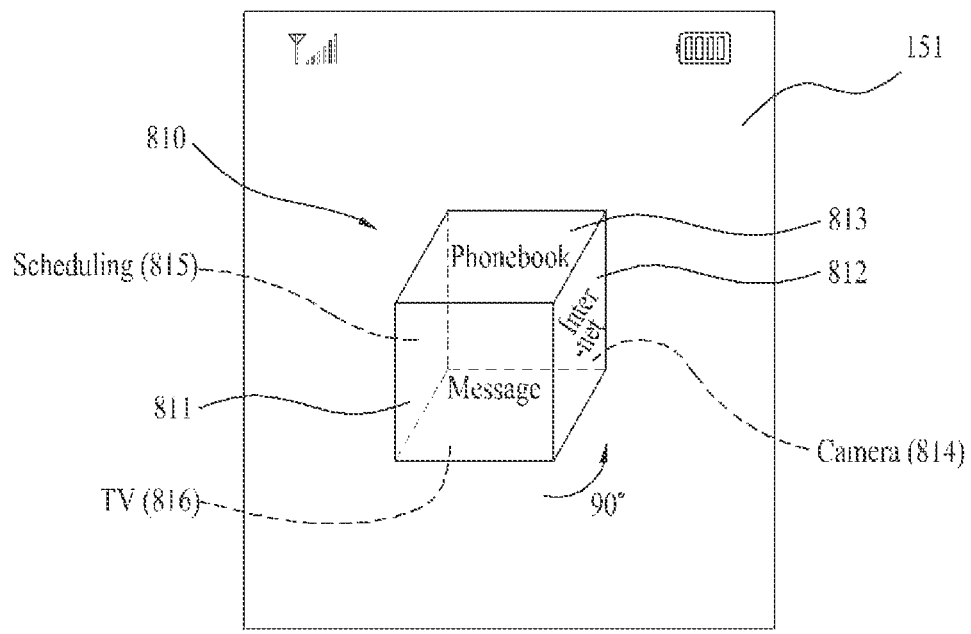
Figure 14C:
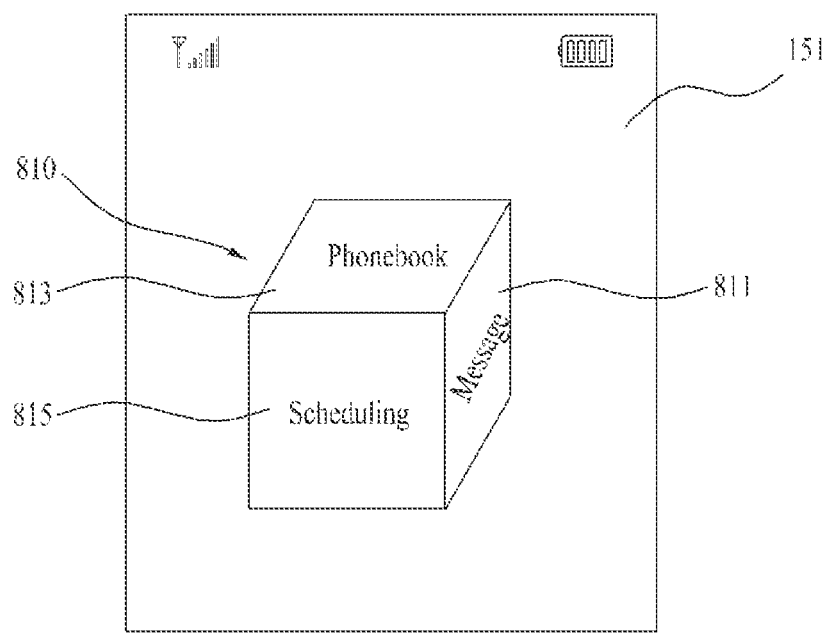

Referring to FIG. 14A, the polyhedron 810 can be rotated by a touch & drag input. For example, if a touch & drag input is performed from a first facet 811, such as a message menu item, of the polyhedron 810 to a second facet 812, such as a Internet menu item, adjacently located to the right of the first facet 811 (element 1, FIG. 14A), the mobile terminal 100 can have the first facet 811 repositioned to a location of the second facet 812 by rotating the polyhedron 810 90 degrees in a rightward direction, as illustrated in FIG. 14B. In another example, if a touch & drag input is performed from a first facet 811, such as a message menu item, of the polyhedron 810 to a third facet 813, such as a phonebook menu item, adjacently located above the first facet 811 (element 2, FIG. 14A), the mobile terminal 100 can have the first facet 811 repositioned to a location of the third facet 813 by rotating the polyhedron 810 by 90 degrees in an upward direction, as illustrated in FIG. 14C.

Additional menu items, such as a camera menu item 814, scheduling menu item 815, and television (TV) menu item 816, on facets not visible on the polyhedron 810 displayed on the display module 151 can be become visible to a user after repositioning the polyhedron 810 for the user to select.

Figure 14D:
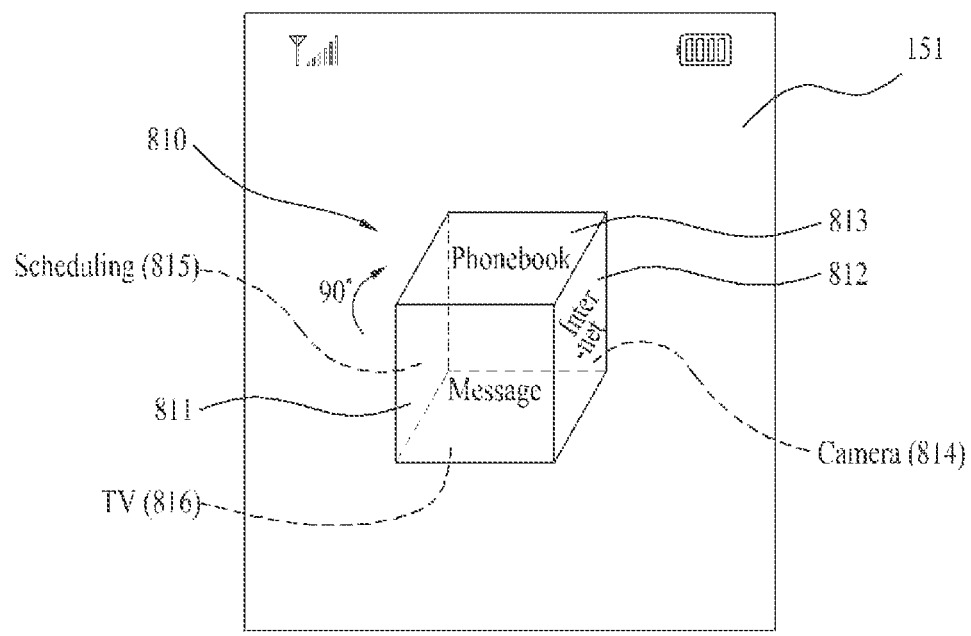
Figure 14E:
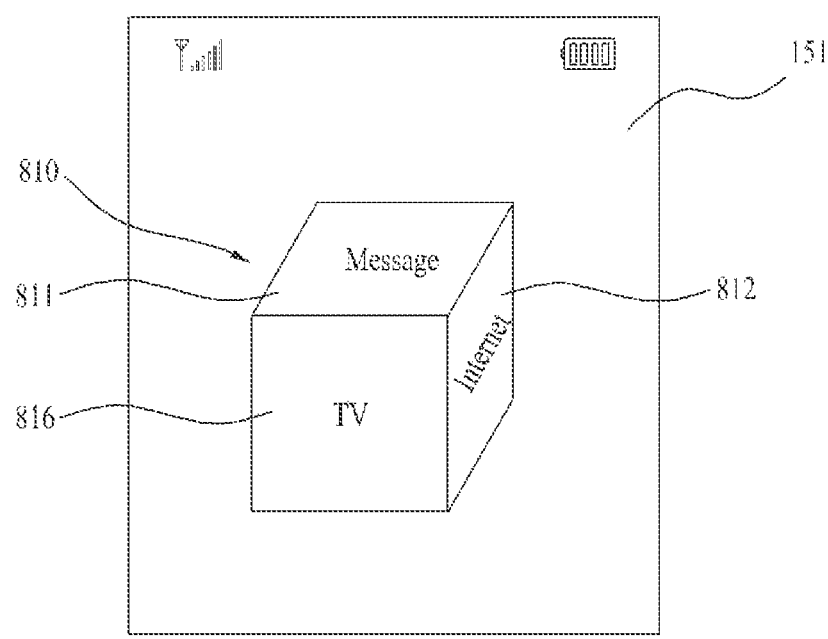

Referring to FIG. 14D, the polyhedron 810 can be rotated in an upward or downward direction at a predetermined angle of 90 degrees. For example, the polyhedron 810 having the message menu item 811 facing forward can be altered to reposition the polyhedron 810 with a television menu item 816 facing forward by rotating the polyhedron 810 in the upward direction, as illustrated in FIG. 14E. In other examples, the polyhedron 810 can be rotated downward so that the polyhedron 810 displays the phonebook menu item 813 in the front-view side.

Figure 15A:
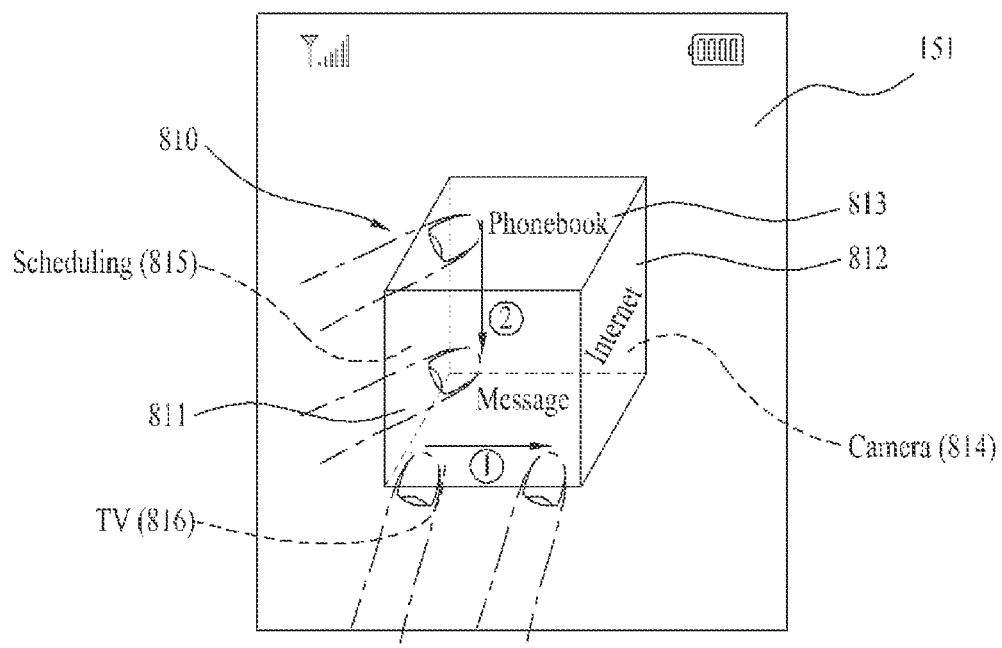
FIGS. 15A to 15E are diagrams of screen configurations for rotating a polyhedron to correspond to a position shift signal according to an embodiment of the present invention.
Figure 15B:
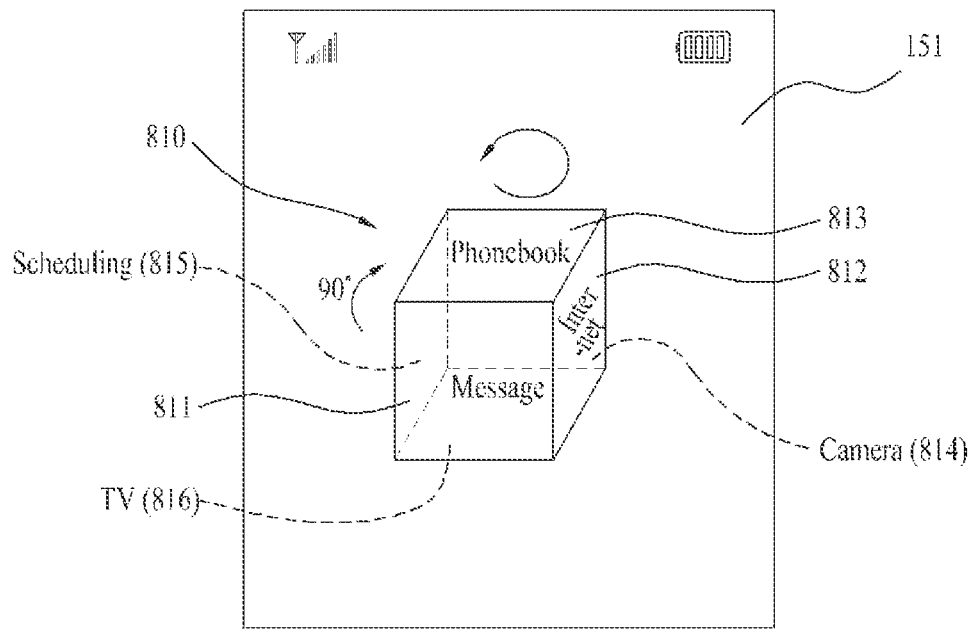
Figure 15C:
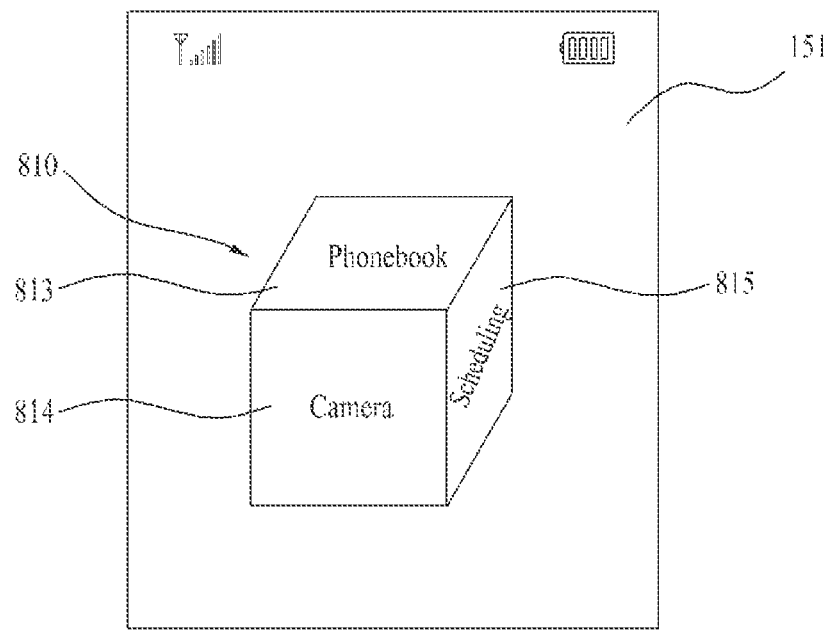

FIGS. 15A to 15E are diagrams of screen configurations for rotating a polyhedron to correspond to a polyhedron rotation signal according to an embodiment of the present invention. For example, if a touch & drag input in a rightward direction (element 1, FIG. 15A) or a downward direction (element 2, FIG. 15A) is detected, the mobile terminal 100 can rotate the polyhedron 810 at a predetermined angle of 90 degrees, as illustrated in FIG. 15B, in the rightward or downward direction to correspond to a touch & drag speed and distance input, as illustrated in FIG. 15C.

Referring to FIGS. 15B and 15C, if the polyhedron 810 is rotating, it can be displayed in a reduced size compared to when the polyhedron 810 is in a stationary position. Menu names represented on facets of the polyhedron 810 may not be recognizable due to the rotational speed when the polyhedron 810 is rotating. When the polyhedron 810 arrives at the stationary position, the menu names on the facets of the polyhedron 810 can be recognized.

Figure 15D:
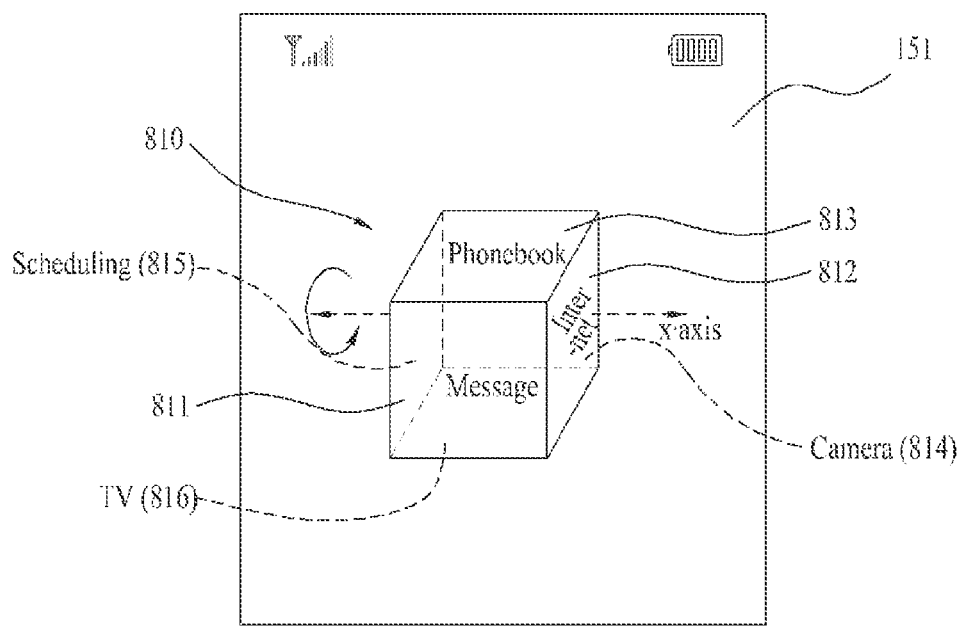

Referring to FIG. 15D, if a touch & drag input in a downward direction is detected, the mobile terminal 100 can rotate the polyhedron 810 at a predetermined angle or relative to the touch & drag input in the downward direction. For example, the polyhedron 810 displays a message menu item 811, an Internet menu item 812 and a phonebook menu item 813 while a camera menu item 814, a scheduling menu item 815, and a television (TV) menu item 816 are positioned on non-visible facets of the polyhedron 810 when the polyhedron 810 is in a stationary position.

Figure 15E:
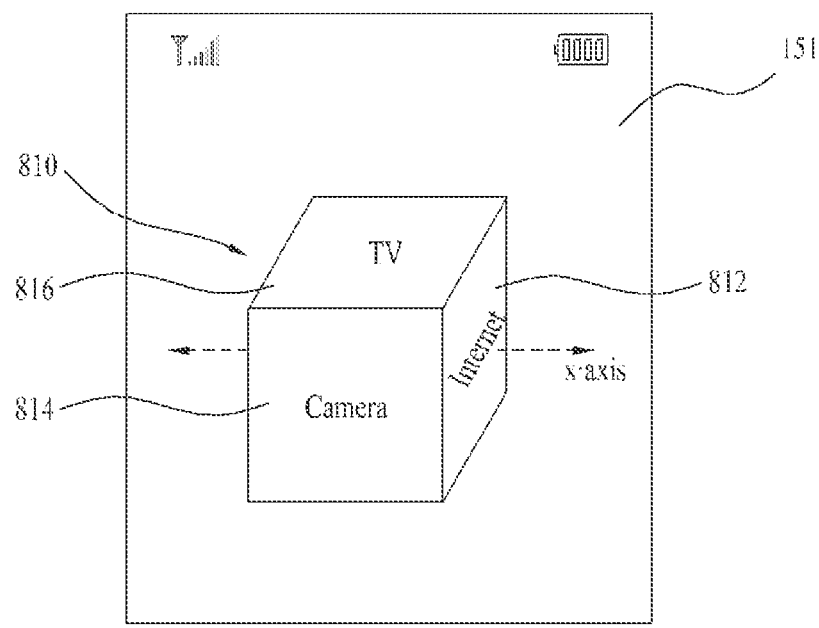

When the polyhedron 810 is rotated in the downward direction, the polyhedron 810 displays the camera menu item 814 on the front-view side and the TV menu item 816 is positioned adjacently above the camera menu item 814 while the Internet menu item 812 remains in the same position since the polyhedron 810 rotated along the x-axis, as illustrated in FIG. 15E. In some embodiments, the polyhedron scroll or rotation signal can be distinctively input using a touch & drag speed input, a multi-touch system, a terminal motion speed input detected by a gyro-sensor (not shown), a signal via a menu item on the polyhedron 810, or a touch action input matching a corresponding signal input.

Referring to FIG. 6, the mobile terminal 100 can receive an input of one of various control signals for the polyhedron displayed on the display unit 151. Further, the mobile terminal 100 is then able to control the displayed polyhedron to correspond to the input control signal under the control of the controller unit 180.

Figure 16A:
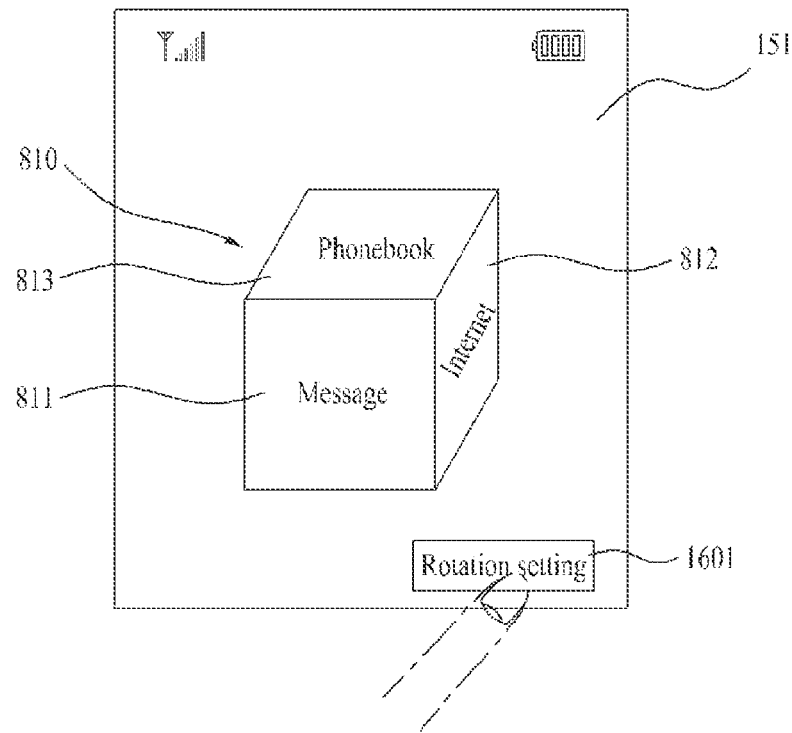
FIG. 16A and FIG. 16B are diagrams of screen configurations for setting a rotational extent of a polyhedron according to an embodiment of the present invention.
Figure 16B:
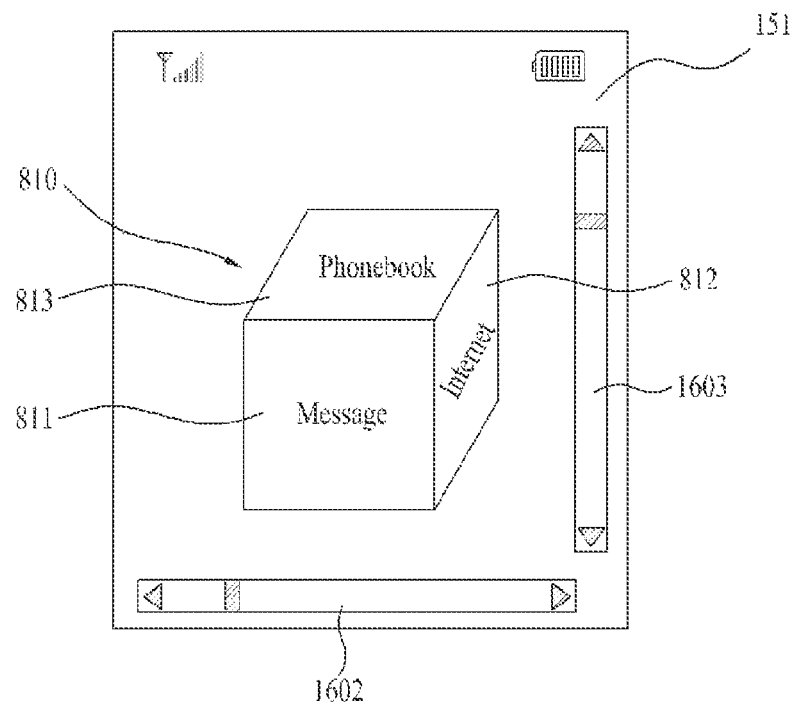

FIG. 16A and FIG. 16B are diagrams of screen configurations for setting a rotational angle of a polyhedron according to an embodiment of the present invention. The mobile terminal 100 can receive an input related to a rotational status setting signal from a user to display a rotational status setting bar for setting a rotational status at a prescribed region of the display module 151.

For example, the rotational status setting signal can be input if a Rotation setting field 1601 for receiving a rotational status setting signal input from a user is selected. In other examples, a key or menu item corresponding to the rotational status setting signal input can be selected by the user.

Referring to FIG. 16B, the rotational status setting bar can include a horizontal bar 1602 for setting a rightward or leftward rotational operation and a vertical bar 1603 for setting an upward or downward rotational operation. Therefore, a user can predetermine rotation settings of the polyhedron 810 by setting a rotational angle, a rotational speed and a rotational direction in a leftward or rightward direction using the horizontal bar 1602 or in an upward or downward direction using the vertical bar 1602.

Figure 17A:
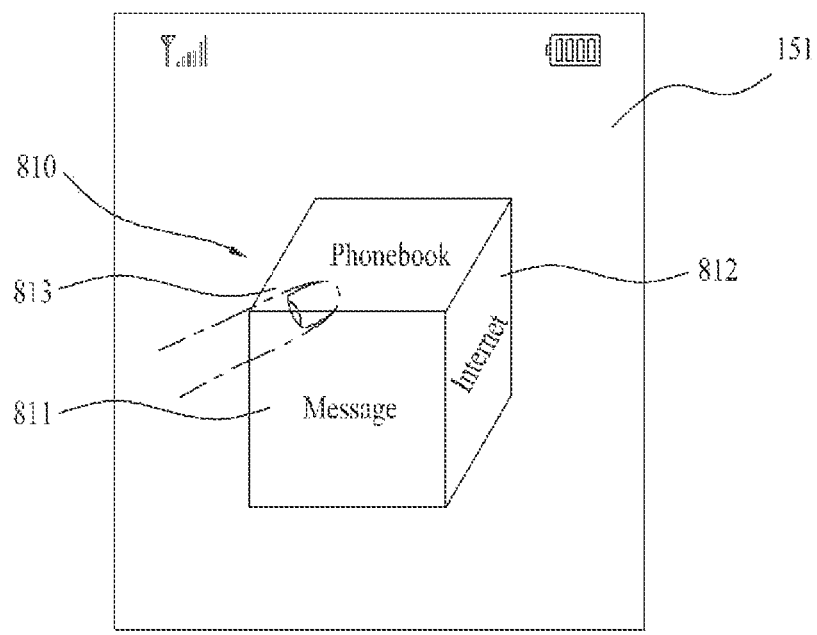
FIGS. 17A to 17C are diagrams of screen configurations for a process for changing a facet arranged at a front side of a polyhedron according to an embodiment of the present invention.
Figure 17B:
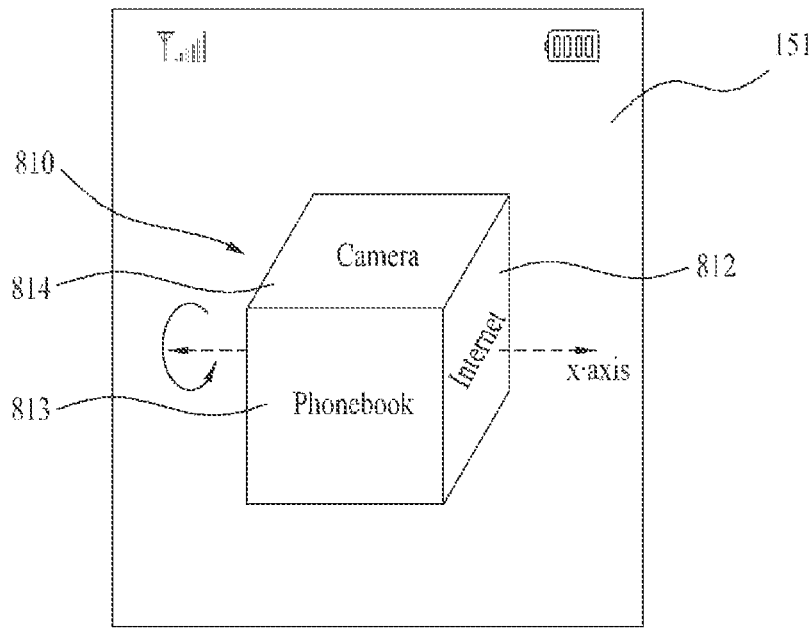
Figure 17C:
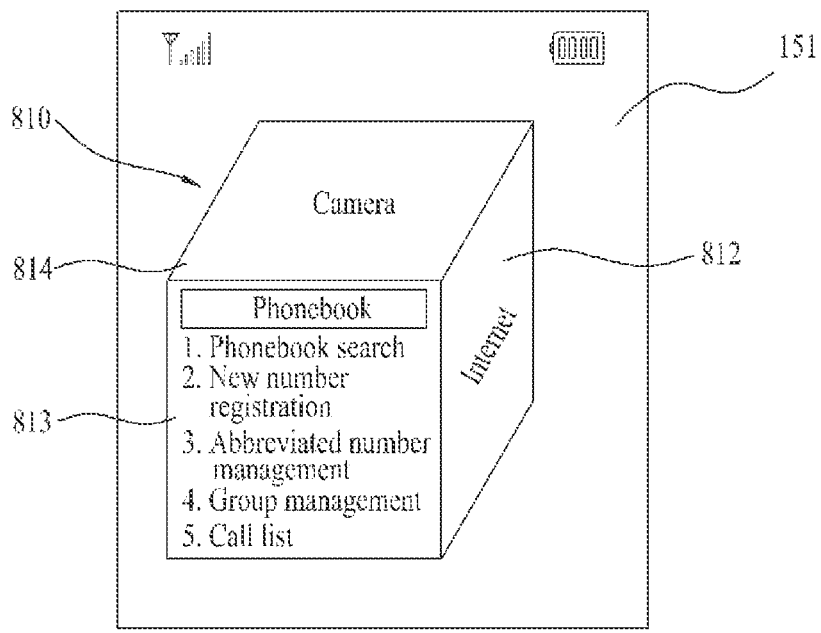

FIGS. 17A to 17C are diagrams of screen configurations for a process of changing a facet to be arranged at a front-view of the polyhedron 810 according to an embodiment of the present invention.

Referring to FIG. 17A, the mobile terminal 100 can receive an input from a user for selecting a specific facet of a polyhedron that displays upper menu items as display target objects and repositioning the polyhedron so that the selected facet is on a front-view side to display sub-items belonging to an upper menu item designated to the selected facet. For example, a user can select a specific facet by a touch action to the specific facet or by manipulation of keys such as a directional key stroke or pressing a number key corresponding to the specific facet.

Referring to FIG. 17B, the polyhedron 810 can be repositioned to display the selected specific facet on a front-view side. For example, if a user selects the phonebook menu item 813 which is located adjacently above the message menu item 811 located on the front-view side of the polyhedron 810, the mobile terminal 100 can reposition the polyhedron 810 so that the phonebook menu item 813 is located on the front-view side by rotating the polyhedron 810 in a downward direction along the x-axis. Referring to FIG. 17C, the mobile terminal 100 can display a list of submenu items relating to the phonebook menu item 813, which is the selected specific facet of the polyhedron 810 while the phonebook menu item 813 is arranged to the front-view side.

In other examples, the mobile terminal 100 can display a list of submenu items constructing a corresponding upper menu item displayed on a front-view sided facet without rotating the polyhedron 810 when the front-view sided facet is selected (not shown). In some embodiments, the display size of the polyhedron 810 can be enlarged or only the display size of the selected facet can be enlarged when the list of submenu items is displayed on the selected facet of the polyhedron 810.

Figure 18A:
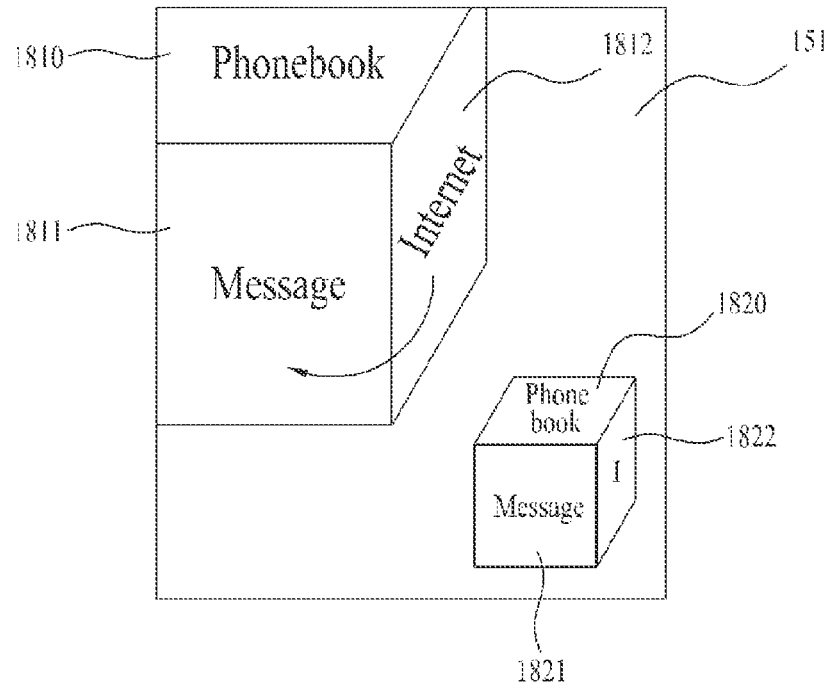
FIG. 18A and FIG. 18B are diagrams of screen configurations for displaying an enlarged polyhedron and a reduced polyhedron according to an embodiment of the present invention.
Figure 18B:
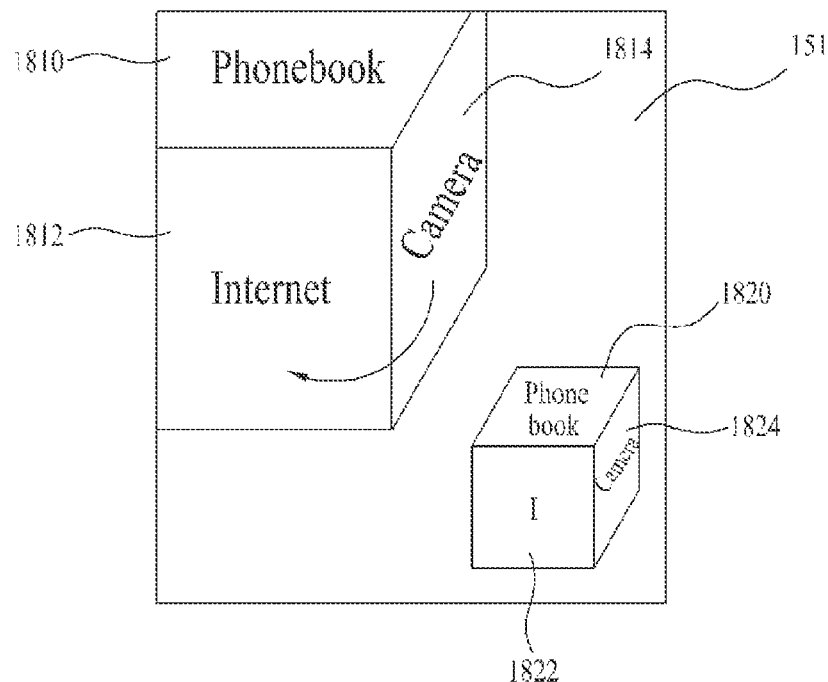

FIG. 18A and FIG. 18B are diagrams of screen configurations for displaying an enlarged polyhedron and a reduced polyhedron according to an embodiment of the present invention. For clarity and convenience of the following description, it is assumed that the enlarged polyhedron and the reduced polyhedron are distinct in size but designate a same display target object to a same facet.

Referring to FIG. 18A, the mobile terminal 100 can display a display target object designated to each facet of an enlarged polyhedron 1810 and display a reduced polyhedron 1820 that corresponds to the enlarged polyhedron 1810. For example, the reduced polyhedron 1820 can be manipulated to enable a facet, such as a message menu item 1811, of the enlarged polyhedron 1810, which is located in a front-view side in both polyhedrons. Additionally, the enabled facet can be distinguished from the other facets on the reduced polyhedron 1820.

Referring to FIG. 18B, the mobile terminal 100 can rotate the enlarged polyhedron 1810 to the left to rearrange the Internet menu item 1812 on the front-view side. Accordingly, the reduced polyhedron 1820 also displays the Internet menu item 1812 on the front-view side so that the Internet menu item 1812 can be enabled.

The enlarged polyhedron 1810 can be further manipulated to display the enabled facet on the reduced polyhedron 1820. Therefore, a user can be provided with an overall shape of the enlarged polyhedron 1810 or a current state of the enlarged polyhedron 1810 via the reduced polyhedron 1820. Preferably, the current state illustrates the front-view side related to the enlarged polyhedron 1810.

Moreover, the enlarged polyhedron 1810 and the reduced polyhedron 1820 can have similar arrangements of the facets. If a polyhedron scroll signal for the enlarged polyhedron 1810 is input, both of the enlarged polyhedron 1810 and the reduced polyhedron 1820 can be scrolled in response to the received polyhedron scroll signal. The polyhedron scroll signal is one example of a polyhedron display control signal.

Furthermore, the mobile terminal 100 can receive a polyhedron display control signal input, such as a position shift signal, for the reduced polyhedron 1820. The mobile terminal 100 can therefore control a display setting of the enlarged polyhedron 1810 in response to the received polyhedron display control signal.

Figure 19A:
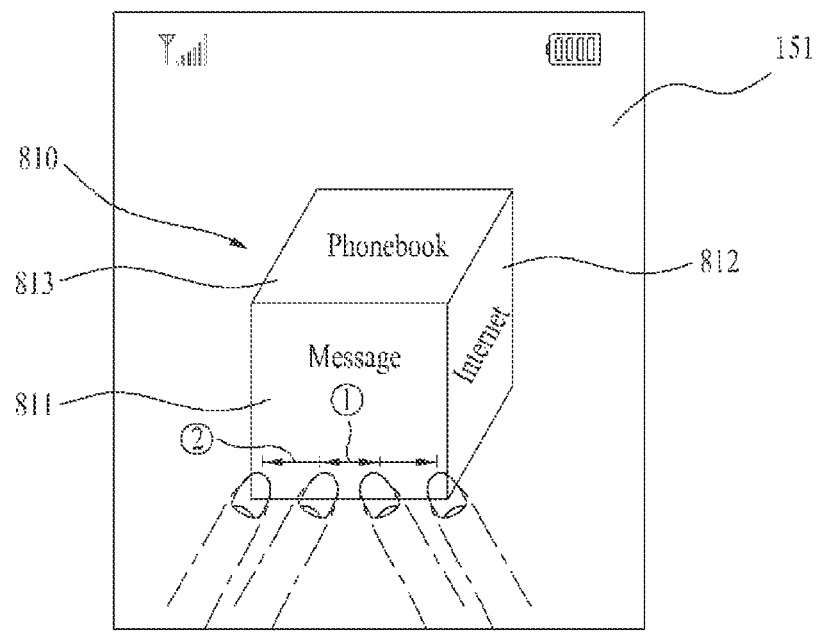
FIGS. 19A to 19D are diagrams of screen configurations for enlarging a polyhedron according to an embodiment of the present invention.

FIGS. 19A to 19D are diagrams of screen configurations for enlarging a polyhedron according to an embodiment of the present invention. Referring to FIG. 19A, if a touch action corresponding to a polyhedron enlarging command is received by the mobile terminal 100 via the user input unit 130, the mobile terminal 100 can enlarge the polyhedron 810 according to the received touch action. Moreover, when receiving a touch action input corresponding to a polyhedron reducing command, the mobile terminal 100 can reduce the display size of the polyhedron 810 (not shown).

Figure 19B:
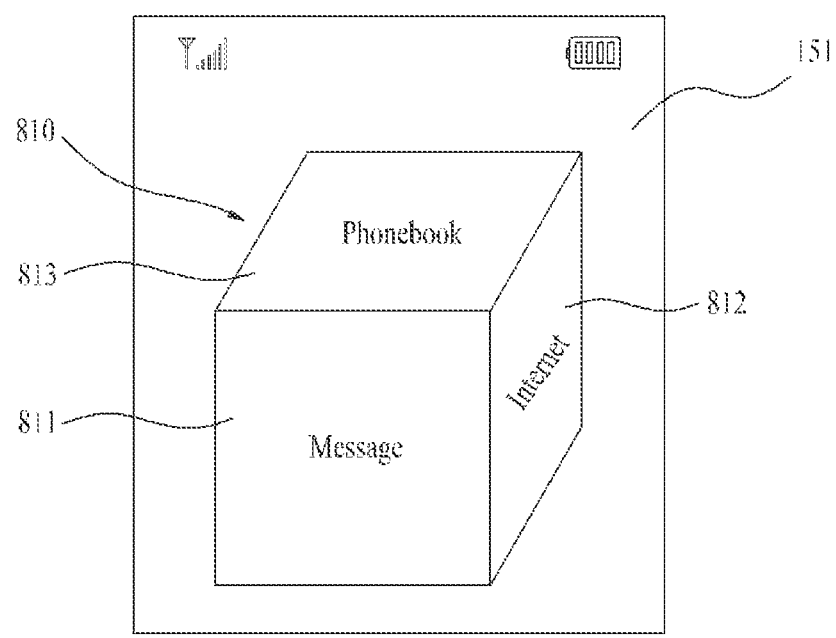

Referring to FIG. 19A, the touch action can include a multi-touch operation including first and second distances between two pointers relative to the polyhedron 810. The mobile terminal 100 can enlarge the polyhedron 810 relative to the distance between the two pointers, as illustrated in FIG. 19B. For example, the first distance may indicate a first enlarging size of the polyhedron 810 and the second distance may indicate a second enlarging size of the polyhedron 810 such that the enlarging size created by the first distance is greater than the second distance.

Figure 19C:
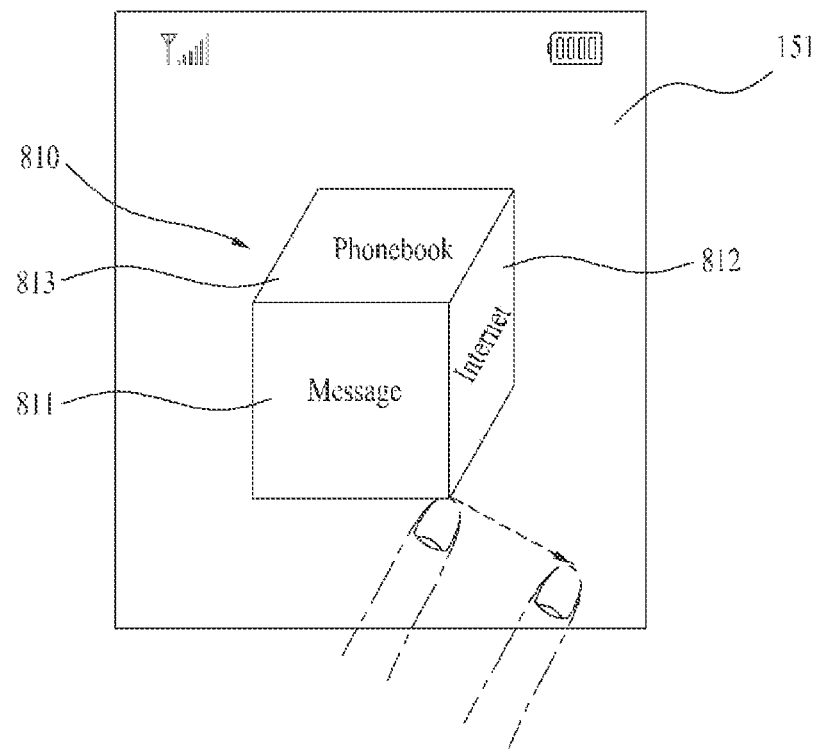
Figure 19D:
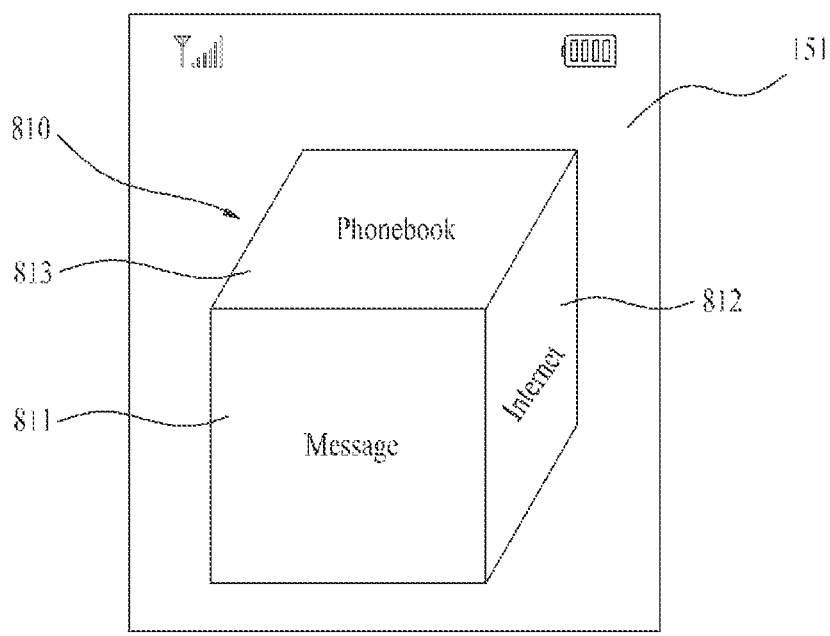

Referring to FIG. 19C, the touch action can be a touch & drag input from a first point within the polyhedron 810 to a second point, such as a point external to the polyhedron 810. The mobile terminal 100 can enlarge the polyhedron 810 relative to the distance between the first and second points, as illustrated in FIG. 19D.

Figure 20A:
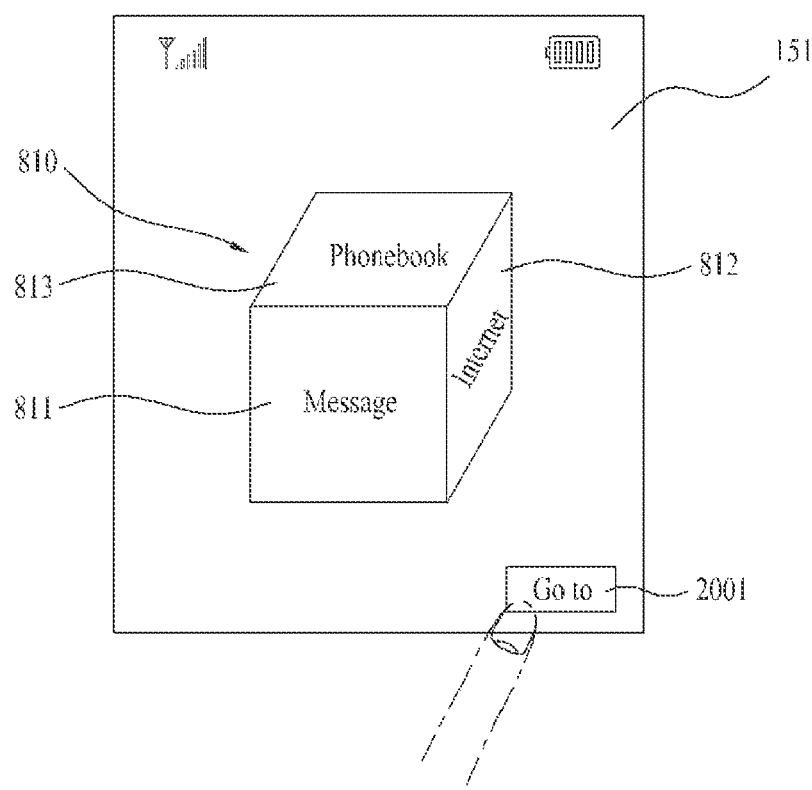
FIGS. 20A to 20C are diagrams of screen configurations for shifting a position of a polyhedron according to an embodiment of the present invention.
Figure 20B:
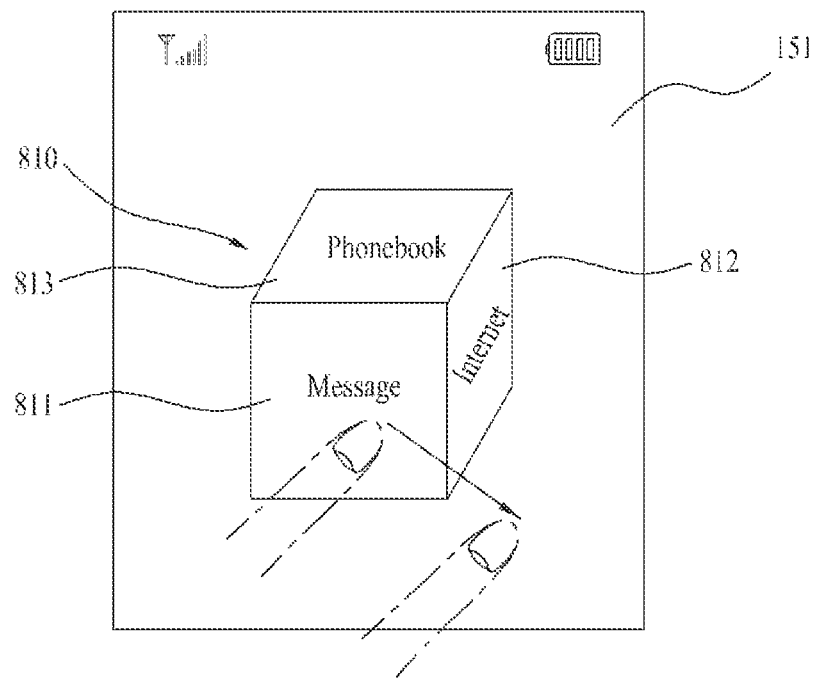
Figure 20C:
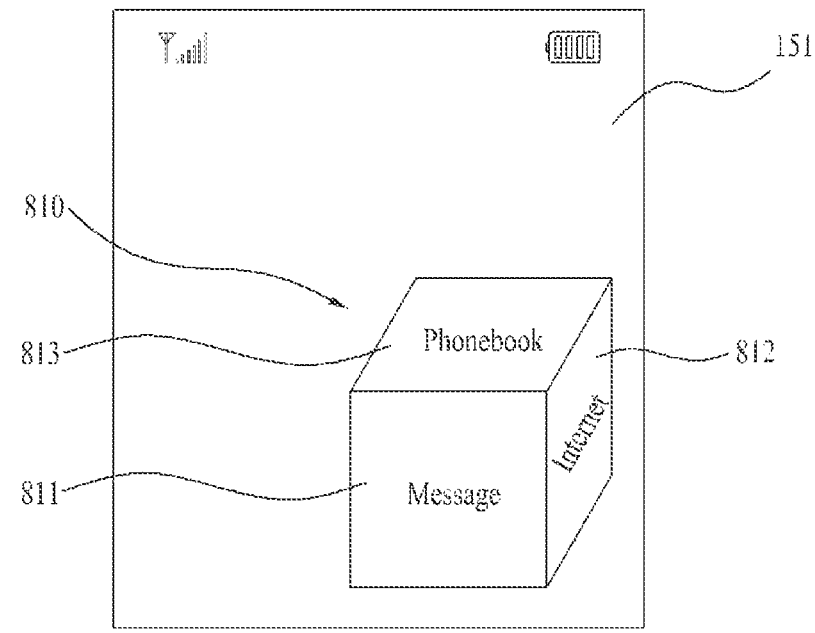

FIGS. 20A to 20C are diagrams of screen configurations for shifting a position of a polyhedron according to an embodiment of the present invention. Referring to FIG. 20A, when receiving a polyhedron shift command signal input, the mobile terminal 100 can set a polyhedron to a shift-ready status.

For example, if a key region 2001 (e.g., "Go to") related to the polyhedron shift command signal input is selected by a user, the shifting of the polyhedron position can be performed. In other examples, the position of the polyhedron 810 can be shifted when a key or menu item corresponding to the polyhedron shift command signal input is selected by a user.

Referring to FIG. 20B, a user can designate the polyhedron shift to a new position on the display by providing an input via the user input unit 130. For example, a user may touch a specific point of the display module 151 to shift the polyhedron 810 to the specific point. In another example, the user may touch & drag the polyhedron 810 to a specific point on the display, thereby shifting the polyhedron 810 from a starting point to a resting point according to the touch & drag action. Referring to FIG. 20C, when the shift-ready status of the polyhedron 810 is set, the mobile terminal 100 can shift the polyhedron from a first position to a second position on the display module 151 designated by a user.

Figure 21A:
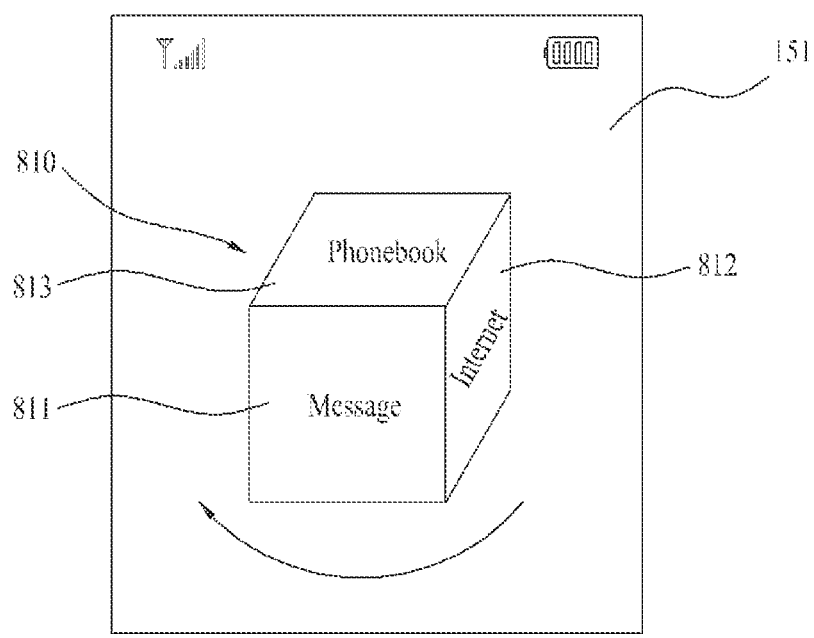
FIGS. 21A to 21C are diagrams of screen configurations for adjusting a size of a polyhedron in the course of a rotational display of the polyhedron according to an embodiment of the present invention.
Figure 21B:
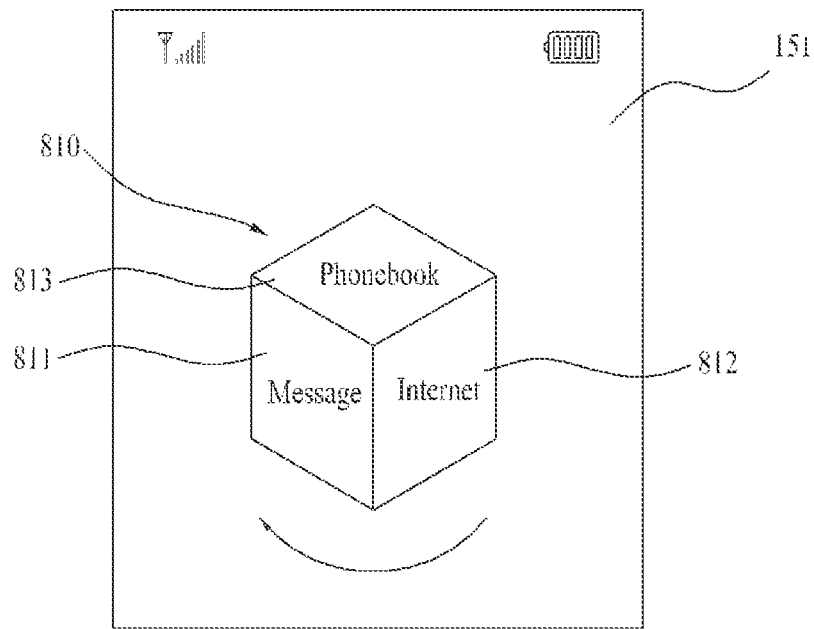
Figure 21C:
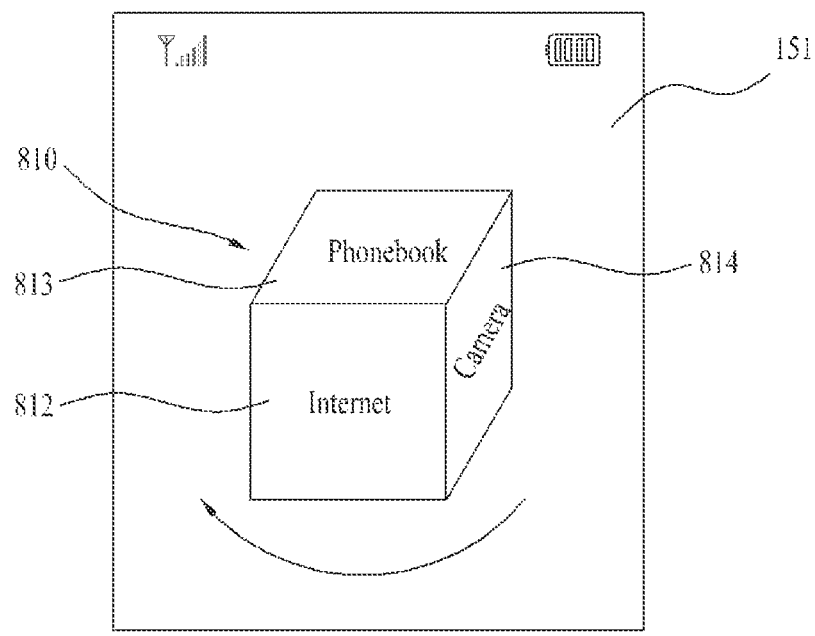

FIGS. 21A to 21C are diagrams of screen configurations for adjusting a size of a polyhedron when the polyhedron 810 is being rotated on the display module 151 according to an embodiment of the present invention. Referring to FIG. 21A, the mobile terminal 100 can enlarge the polyhedron 810 when the polyhedron 810 has been rotated to a new position. In other words, a display target object represented on each facet of the polyhedron 810 can be enlarged in size.

Alternatively, the mobile terminal 100 can enlarge a first facet located on a front-view side of the polyhedron 810 that is designated with a message menu item 811. In other words, a display target object represented on a facet located on the front-view side of the polyhedron 810 can be enlarged in size.

Referring to FIG. 21B, the mobile terminal 100 can reduce the size of the polyhedron 810 while the polyhedron 810 rotates to a new position such that a different facet is arranged to the front-view side of the polyhedron 810. Referring to FIG. 21C, when the polyhedron 810 rotates so that a second facet designated with an Internet menu item 812 is sequentially arranged to the front-view side of the polyhedron 810, the mobile terminal 100 can either enlarge the polyhedron 810 or enlarge the second facet designated with the Internet menu item 812.

Referring to FIG. 6, the mobile terminal 100 can receive an execution command signal input via the user input unit 130 for at least one facet constructing the displayed polyhedron [S660]. In order to distinguish between the display control signal input and the execution command signal input, the controller unit 180 can differentiate each touch count, touch time, or touch motion (e.g., specific shape, specific direction).

Subsequently, under the control of the controller unit 180, the mobile terminal 100 executes the display target object designated to one facet corresponding to the execution command signal input [S670]. The execution operation can be an execution operation of the display target object and can display detail information about the display target object, a menu item execution corresponding to the display target object, or a data output corresponding to the display target object.

For example, if a display target object is a message, such as a menu item execution corresponding to the display target object, the display target object can display a list, such as detail information about the display target object, of submenu items related to the message as an execution operation. In another example, if a display target object is TV viewing, such as a menu item execution corresponding to the display target object, the display target object can output a broadcast signal as an execution operation. In yet another example, if a display target object is a photo, such as image data, the display target object can display a corresponding photo on a screen, such as data output corresponding to the display target object.

When executing the display target object [S670], the controller unit 180 may not further display the polyhedron 810 on the display module 151. Moreover, a key region of the display module 151 or a menu item for returning to the polyhedron display state can be separately provided.

FIGS. 22A to 22D are diagrams of screen configurations for executing menu item information designated to one facet of a polyhedron according to an embodiment of the present invention. For clarity and convenience of the following description, it is assumed that the menu item information is an upper menu item name.

Figure 22A:
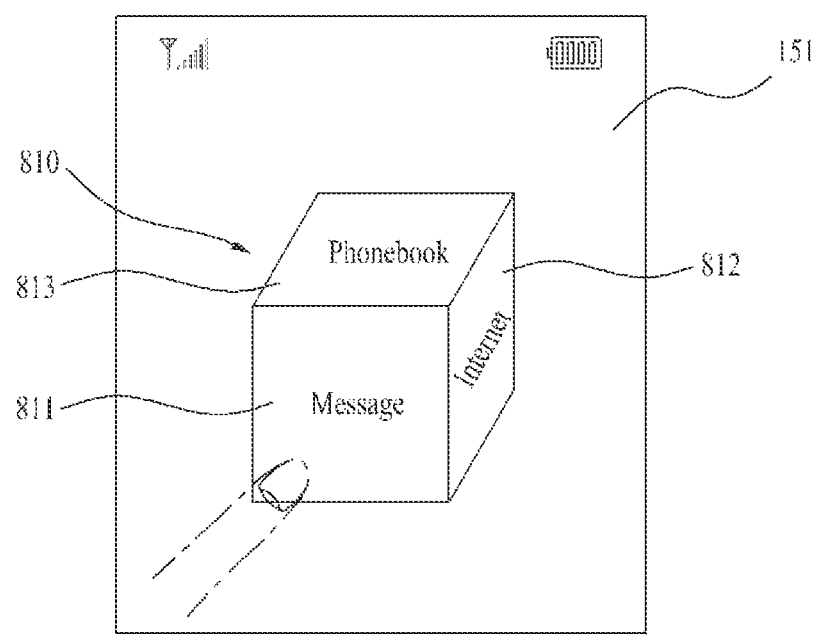
FIGS. 22A to 22D are diagrams of screen configurations for executing menu item information designated to one facet of a polyhedron according to an embodiment of the present invention.

Referring to FIG. 22A, a user can select a first facet designated with a message menu item 811, which is an upper menu item to be executed, from a plurality of facets constructing the polyhedron 810.

Figure 22B:
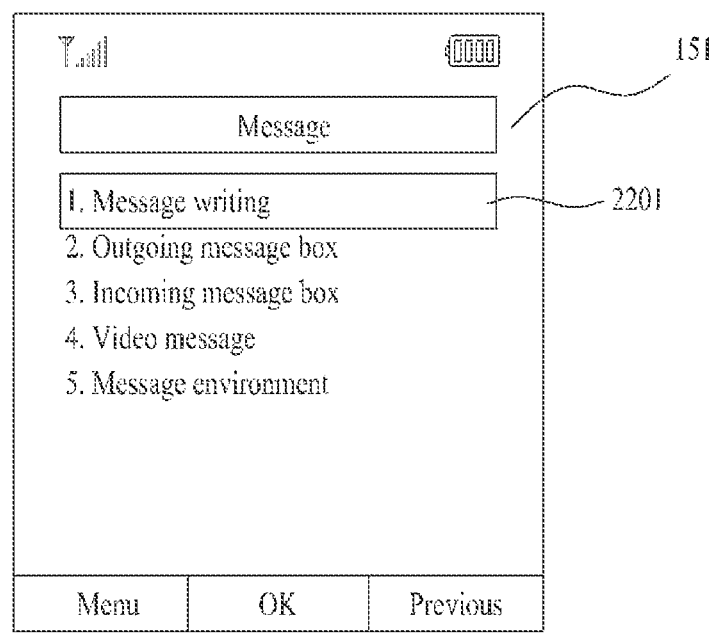

Referring to FIG. 22B, if the message menu item 811 is selected in FIG. 22A, the mobile terminal 100 can display a list of submenu items constructing a message. For example, the list of submenu items relating to the message menu item can include a message writing operation 2201, an outgoing message box operation 2202, an incoming message box operation 2203, a video message operation 2204, and a message environment operation 2205.

Figure 22C:
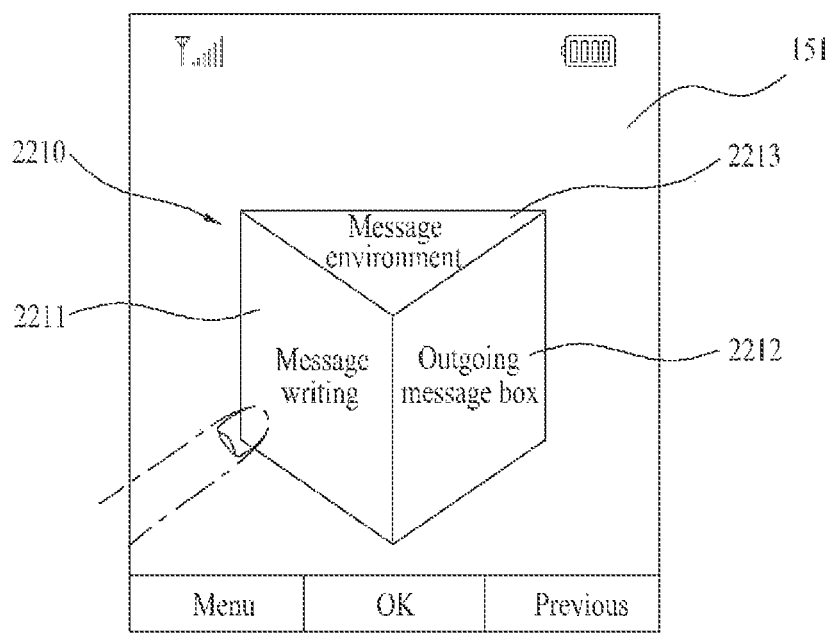

Referring to FIG. 22C, if the message menu item 811 is selected in FIG. 22A, a polyhedron 2210 having facets on which submenu items constructing the message can be represented. For example, the polyhedron 2210 can display the list of submenu items, as illustrated in FIG. 22A, on facets of the polyhedron 2210. The number of facets represented on the polyhedron 2210 relates to the number of submenu items corresponding to the upper menu item.

Figure 22D:
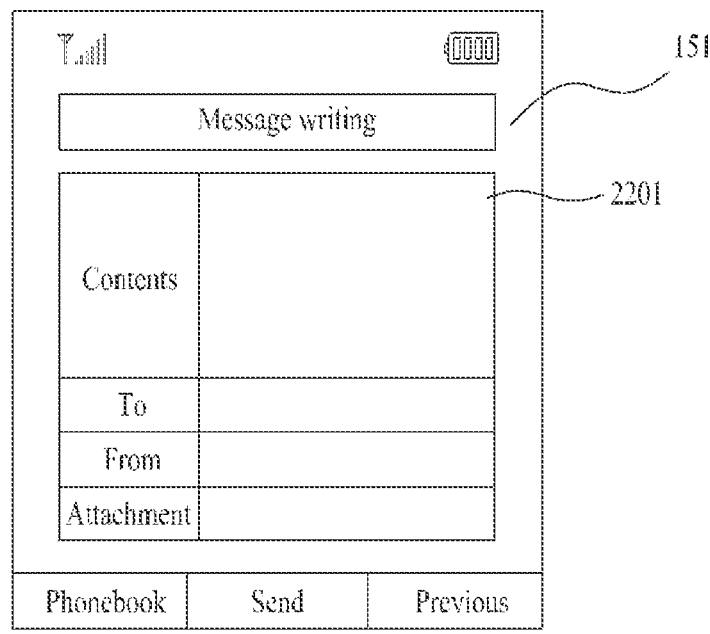

Referring to FIG. 22D, the mobile terminal 100 can execute a message writing menu to control a message writing portal when a user selects either a message writing operation 2201 from the list of submenu items in FIG. 22B or a facet of the polyhedron 2210 designated with the message writing menu item 2211 in FIG. 22C.

Figure 23A:
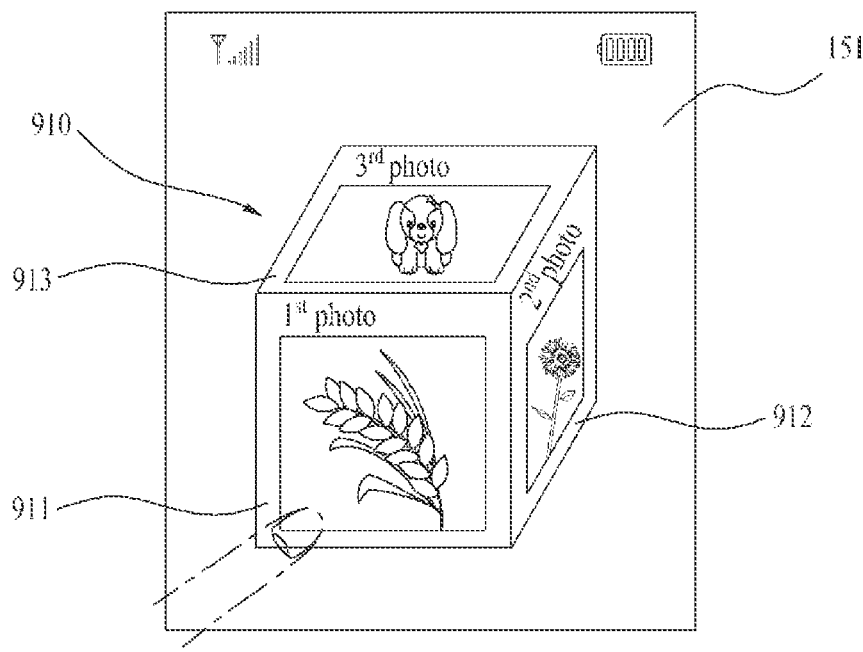
FIG. 23A and FIG. 23B are diagrams of screen configurations for outputting image data designated to one facet of a polyhedron according to an embodiment of the present invention.
Figure 23B:
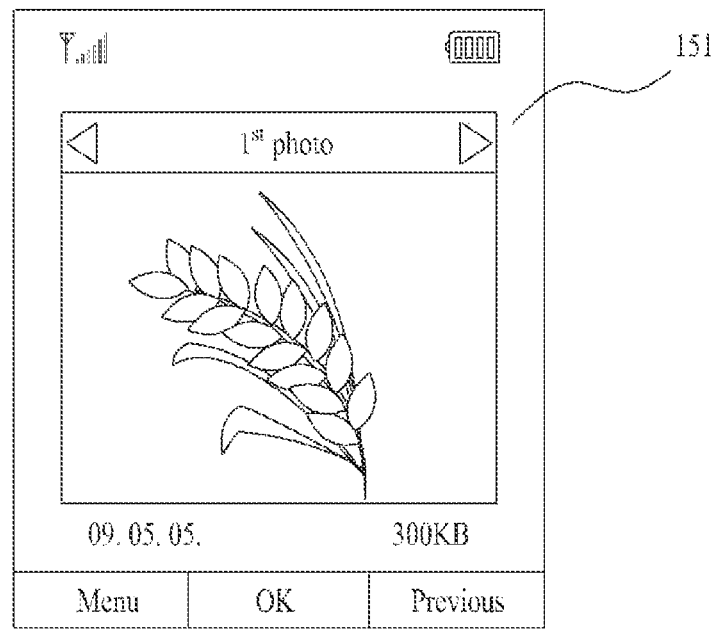

FIG. 23A and FIG. 23B are diagrams of screen configurations for outputting image data designated to one facet of the polyhedron 910 according to an embodiment of the present invention. For clarity and convenience of the following description, it is assumed that image data is a photo.

Referring to FIG. 23A, the mobile terminal 100 can display a polyhedron 910 including a first photo 911, a second photo 912, and a third photo 913 represented on facets of the polyhedron 910. The mobile terminal 100 can receive a selection for the first facet designated with the first photo 911. Referring to FIG. 23B, the mobile terminal 100 can display the first photo 911 designated to the first facet on the display module 151 when the first facet designated with the first photo 911 is selected.

In some embodiments, if a display target object displayed on a polyhedron is menu item information, the mobile terminal 100 can distinguishably display the menu item information corresponding to a currently executed application on a facet of the polyhedron that is designated to the menu item information. An application execution image can be displayed on a corresponding facet. Therefore, a user can be notified of what currently executed application is being performed when the polyhedron is displayed on the display module 151.

The previously-described display controlling method can be implemented in a program recorded medium as computer-readable codes. The computer-readable media include all types of recording devices in which data readable by a computer system are stored. The computer-readable media may include ROM, RAM, CD-ROM, magnetic tapes, floppy discs, optical data storage devices, and the like for example, and may also include carrier-wave type implementations (e.g., transmission via the Internet).

The mobile terminal and display controlling method of the present invention are not limited to the embodiments disclosed herein, but rather the embodiments can be constructed by selective combination thereof entirely or in part to enable various modifications. Accordingly, the present invention provides several effects and/or advantages.

First, a polyhedron having a polyhedral shape corresponding to a number of display target objects can be displayed. A display target object designated to each facet of the polyhedron on the corresponding facet. The present invention can set the polyhedron to a shape according to the display target object.

Second, when rotationally displaying a polyhedron having a display target object designated to each facet of the polyhedron, the present invention can sequentially provide a user with the display target objects designated to the facets of the polyhedron.

It will be apparent to those skilled in the art that various modifications and variations can be made in embodiments of the present invention without departing from the spirit or scope of the invention. Thus, it is intended that embodiments of the present invention can cover the modifications and variations of this invention provided they come within the scope of the appended claims and their equivalents.

What is claimed:

1. A mobile terminal, comprising:
a controller unit for determining a polyhedron having a polyhedral shape according to a number of display target objects and for designating each of the number of display target objects to a facet of the polyhedron; and
a display module for displaying the polyhedron in three dimensions and for displaying each of the number of display target objects on the designated facet of the polyhedron,
wherein the controller unit is further for controlling the display module to:
display information related to each of the number of display target objects, the information corresponding to currently non-visible facets;
simultaneously display a first polyhedron as a larger version of the polyhedron and a second polyhedron as a smaller version of the polyhedron such that at least one currently displayed facet of the first polyhedron is partially displayed and a remainder of the at least one partially displayed facet is positioned beyond an edge of the display module, wherein each currently displayed facet of the first polyhedron corresponds to a currently displayed facet of the second polyhedron with corresponding facets of the first polyhedron and second polyhedron including a same display target object, wherein relative orientation of the display target objects of the first polyhedron is always the same as a relative orientation of the display target objects of the second polyhedron, wherein the display target objects of the first polyhedron are always the same as the display target objects of the second polyhedron; and
simultaneously rotate each of the first polyhedron and second polyhedron based on a received position shift signal input, wherein the rotation of the first polyhedron is about a first axis and the rotation of the second polyhedron is about a second axis, wherein the first axis is offset by a distance relative to the second axis.

2. The mobile terminal of claim 1, wherein each of the number of display target objects comprises at least menu item information, terminal state information, image data, audio data, text data, or widget data.

3. The mobile terminal of claim 1, wherein the controller unit is further for determining the polyhedral shape to have a same number of facets as the number of display target objects.

4. The mobile terminal of claim 1, further comprising:
a user input unit for receiving a designation signal input for designating each of the number of display target objects to a corresponding facet of the displayed polyhedron,
wherein the controller unit is further for designating each of the number of display target objects to the corresponding facet according to the received designation signal input.

5. The mobile terminal of claim 1, wherein the display module is further for:
displaying a first display target object designated to a facet on a front-view side of the first polyhedron; and
displaying a second display target object that corresponds to the first display target object on the second polyhedron such that the second display target object is distinguishable from other facets of the second polyhedron.

6. The mobile terminal of claim 1, further comprising:
a user input unit for receiving an execution command signal input related to a prescribed facet of the displayed polyhedron, wherein the controller unit is further for executing one of the number of display target objects designated to the prescribed facet according to the received execution command signal input.

7. The mobile terminal of claim 6, wherein the controller unit is further for performing at least one operation comprising a detail information display of one of the number of display target objects, a menu item execution corresponding to the one of the number of display target objects, or a data output corresponding to the one of the number of display target objects.

8. The mobile terminal of claim 1, wherein the controller unit is further for controlling the display module to display the polyhedron in a three-dimensional rotational position.

9. The mobile terminal of claim 8, further comprising:
a user input unit for receiving a rotation command signal input related to the displayed polyhedron,
wherein the controller unit is further for controlling the display module to display the polyhedron in the three-dimensional rotational position according to the input rotation command signal input.

10. A mobile terminal, comprising:
a controller unit for designating each of a plurality of display target objects to one of a plurality of facets of a polyhedron; and
a display module for displaying the polyhedron with the plurality of display target objects as designated by the controller unit,
wherein the controller unit is further for controlling the display module to display the polyhedron in a three-dimensional rotational position,
wherein at least one of the plurality of facets is arranged at a front-view side of the polyhedron so the at least one of the plurality of facets is visible, and
wherein the controller unit is further for controlling the display module to:
display information related to each of the display target objects corresponding to currently non-visible facets;
simultaneously display a first polyhedron as a larger version of the polyhedron and a second polyhedron as a smaller version of the polyhedron such that at least one currently displayed facet of the first polyhedron is partially displayed and a remainder of the at least one partially displayed facet is positioned beyond an edge of the display module, wherein each of currently displayed facets of the first polyhedron corresponds to a currently displayed facet of the second polyhedron with corresponding facets of the first polyhedron and second polyhedron including a same display target object, wherein relative orientation of the display target objects of the first polyhedron is always the same as a relative orientation of the display target objects of the second polyhedron, wherein the display target objects of the first polyhedron are always the same as the display target objects of the second polyhedron; and
simultaneously rotate each of the first polyhedron and second polyhedron based on a received position shift signal input, wherein the rotation of the first polyhedron is about a first axis and the rotation of the second polyhedron is about a second axis, wherein the first axis is offset by a distance relative to the second axis.

11. The mobile terminal of claim 10, further comprising:
a user input unit for receiving a designation signal input for designating each of the plurality of display target objects to a corresponding one of the plurality of facets of the polyhedron,
wherein the controller unit is further for designating each of the plurality of display target objects to the corresponding one of the plurality of facets according to the received designation signal input.

12. The mobile terminal of claim 10, wherein the controller is further for controlling the display module to display the polyhedron in the three-dimensional rotational position for a predetermined duration of time to correspond with a predetermined rotational direction or a predetermined rotational speed.

13. The mobile terminal of claim 10, further comprising:
a user input unit for receiving a rotation stop signal input related to a rotational position of the displayed polyhedron,
wherein the display module is further for terminating the rotational position of the displayed polyhedron according to the received rotation stop signal input.

14. The mobile terminal of claim 10, further comprising:
a user input unit for receiving an execution command signal input related to a specific one of the plurality of facets of the displayed polyhedron,
wherein the controller unit is further for executing one of the plurality of display target objects designated to the specific one of the plurality of facets corresponding to the received execution command signal input.

15. A method of controlling a display in a mobile terminal, the method comprising:
determining a polyhedral shape to correspond to a number of display target objects;
designating each of the number of display target objects to a corresponding facet of a polyhedron having the determined polyhedral shape;
displaying the polyhedron having the determined polyhedral shape in a three-dimensional rotational position;
displaying each of the number of display target objects on the corresponding designated facet of the polyhedron;
displaying information related to each of the display target objects corresponding to currently non-visible facets;
simultaneously displaying a first polyhedron as a larger version of the polyhedron and a second polyhedron as a smaller version of the polyhedron such that at least one currently displayed facet of the first polyhedron is partially displayed and a remainder of the at least one partially displayed facet is positioned beyond an edge of the display module, wherein each of currently displayed facets of the first polyhedron corresponds to a currently displayed facet of the second polyhedron with corresponding facets of the first polyhedron and second polyhedron including a same display target object, wherein relative orientation of the display target objects of the first polyhedron is always the same as a relative orientation of the display target objects of the second polyhedron, wherein the display target objects of the first polyhedron are always the same as the display target objects of the second polyhedron; and
simultaneously rotating each of the first polyhedron and second polyhedron based on a received position shift signal input, wherein the rotation of the first polyhedron is about a first axis and the rotation of the second polyhedron is about a second axis, wherein the first axis is offset by a distance relative to the second axis.

16. The method of claim 15, wherein at least one of the number of display target objects is arranged at a front-view side of the polyhedron so the at least one of the number of display target objects is visible when the polyhedron is displayed.

* * * * *